(12) United States Patent
Kato et al.

(10) Patent No.: US 10,971,991 B2
(45) Date of Patent: Apr. 6, 2021

(54) POWER CONVERSION DEVICE AND POWER CONVERSION SYSTEM

(71) Applicant: Mitsubishi Electric Corporation, Chiyoda-ku (JP)

(72) Inventors: Takahiro Kato, Chiyoda-ku (JP); Kikuo Izumi, Chiyoda-ku (JP); Akiko Tabuchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/612,830

(22) PCT Filed: Feb. 19, 2018

(86) PCT No.: PCT/JP2018/005658
§ 371 (c)(1),
(2) Date: Nov. 12, 2019

(87) PCT Pub. No.: WO2019/016991
PCT Pub. Date: Jan. 24, 2019

(65) Prior Publication Data
US 2020/0204057 A1  Jun. 25, 2020

(30) Foreign Application Priority Data
Jul. 21, 2017  (JP) .............................. JP2017-141668

(51) Int. Cl.
*H02M 1/12* (2006.01)
*H02M 7/493* (2007.01)
*H02M 1/00* (2006.01)

(52) U.S. Cl.
CPC ........... *H02M 1/126* (2013.01); *H02M 7/493* (2013.01); *H02M 2001/0009* (2013.01)

(58) Field of Classification Search
CPC ........ H02M 1/12; H02M 1/126; H02M 7/493; H02M 2001/0003; H02M 2001/0009;
(Continued)

(56) References Cited

U.S. PATENT DOCUMENTS

| 2012/0206077 A1* | 8/2012 | Yoneshima | ............. H02P 27/08 318/400.33 |
| 2015/0130432 A1* | 5/2015 | Yamazaki | ............. H02M 5/297 323/272 |

(Continued)

FOREIGN PATENT DOCUMENTS

JP  2010-288437 A  12/2010

OTHER PUBLICATIONS

International Search Report dated Apr. 10, 2018 in PCT/JP2018/005658 filed on Feb. 19, 2018.

*Primary Examiner* — Adolf D Berhane
(74) *Attorney, Agent, or Firm* — Xsensus LLP

(57) ABSTRACT

A controller of each power conversion device in a power conversion system controls a switching element unit, based on a detected value of reactor current flowing through a filter reactor, a detected value of output voltage output between the terminals of a filter capacitor, and a detected value of output current flowing through an output reactor. The controller generates a voltage command based on the output current and the output voltage and generates a correction amount of the voltage command based on the output current in which a reference frequency component is removed. The controller generates a current command based on the addition value of the voltage command and the correction amount and controls the switching element unit such that the reactor current matches the current command.

12 Claims, 26 Drawing Sheets

(58) Field of Classification Search
CPC ............ H02M 7/42; H02M 7/44; H02M 7/46; H02M 2007/4822
See application file for complete search history.

(56) References Cited

U.S. PATENT DOCUMENTS

| | | | |
|---|---|---|---|
| 2016/0308459 A1* | 10/2016 | Fujii | H02M 1/12 |
| 2017/0126142 A1* | 5/2017 | Toujinbara | H02M 5/458 |
| 2019/0334442 A1* | 10/2019 | Iyasu | H02M 3/33584 |
| 2020/0274357 A1* | 8/2020 | Inoue | H02J 3/32 |
| 2020/0295674 A1* | 9/2020 | Kawai | H02M 1/12 |

* cited by examiner (A)

(B)

POWER CONVERSION DEVICE AND POWER CONVERSION SYSTEM

TECHNICAL FIELD

The present invention relates to a technique that suppresses cross current in a power conversion system including a plurality of power conversion devices connected in parallel.

BACKGROUND ART

A power conversion system including a plurality of power conversion devices connected in parallel is known. In such a power conversion system, when a plurality of power conversion devices operate in parallel to supply power to a load, a deviation in amplitude or phase of output voltage of the power conversion devices may cause cross current among the power conversion devices.

In order to prevent occurrence of cross current, for example, Japanese Patent Laying-Open No. 2010-288437 (PTL 1) discloses a method in which current supplied from a power conversion system to a load (hereinafter referred to as "load current") is detected by a current detector, and a value obtained by dividing the detected load current by the number of devices operating in parallel is used as an output current command per power conversion device to control output current of each power conversion device.

CITATION LIST

Patent Literature

PTL 1: Japanese Patent Laying-Open No. 2010-288437

SUMMARY OF INVENTION

Technical Problem

According to PTL 1 above, load current is extracted for each order of a fundamental component and a harmonic component, and the output current command is generated based on current obtained by dividing the extracted current by the number of devices operating in parallel, whereby imbalance in output current among the power conversion devices is reduced and consequently, cross current of the fundamental component and the harmonic component is suppressed.

Unfortunately, PTL 1 above requires that load current should be detected in order to generate an output current command. Therefore, when some power conversion devices stop due to a failure or the like and the number of devices operating in parallel is changed, delay in detection of load current or delay in generation of an output current command occurs to increase the deviation between the output current command and the load current. Consequently, appropriate current may be unable to be stably supplied to the load.

The present invention has been made in order to solve the problem above, and an object of the present invention is to provide a technique that can stably supply appropriate current to a load even when the number of devices operating in parallel changes in a power conversion system including a plurality of power conversion devices connected in parallel.

Another object of the present invention is to implement the technique above without providing a higher-level control device centrally controlling the plurality of power conversion devices or a master power conversion device of the power conversion devices.

Solution to Problem

A power conversion device according to the present disclosure includes an input terminal connected to a DC power supply, an output terminal connected to a load, a switching element unit configured to convert DC power supplied from the DC power supply to the input terminal into AC power and output the AC power to the output terminal, a filter reactor and a filter capacitor configured to smooth output of the switching element unit, an output reactor disposed between the filter reactor and the load, a first current sensor, a first voltage sensor, a second current sensor, and a control unit. The first current sensor is configured to detect reactor current flowing through the filter reactor. The first voltage sensor is configured to detect output voltage output between terminals of the filter capacitor. The second current sensor is configured to detect output current flowing through the output reactor. The control unit is configured to control the switching element unit, based on detected values of the first and second current sensors and the first voltage sensor. The control unit generates a voltage command based on the output current and the output voltage and generates a correction amount of the voltage command based on the output current in which a reference frequency component is removed. The control unit generates a current command based on an addition value of the voltage command and the correction amount and controls the switching element unit such that the reactor current matches the current command.

A power conversion system according to the present disclosure includes a plurality of power conversion devices connected in parallel with a load. Each of the power conversion devices includes an input terminal connected to a DC power supply, an output terminal connected to the load, a switching element unit configured to convert DC power supplied from the DC power supply to the input terminal into AC power and output the AC power to the output terminal, a filter reactor and a filter capacitor configured to smooth output of the switching element unit, an output reactor disposed between the filter reactor and the load, a first current sensor, a first voltage sensor, a second current sensor, and a control unit. The first current sensor is configured to detect reactor current flowing through the filter reactor. The first voltage sensor is configured to detect output voltage output between terminals of the filter capacitor. The second current sensor is configured to detect output current flowing through the output reactor. The control unit is configured to control the switching element unit, based on detected values of the first and second current sensors and the first voltage sensor. The control unit generates a voltage command based on the output current and the output voltage and generates a correction amount of the voltage command based on the output current in which a reference frequency component is removed. The control unit generates a current command based on an addition value of the voltage command and the correction amount and controls the switching element unit such that the reactor current matches the current command.

Advantageous Effects of Invention

According to the present disclosure, in a power conversion system including a plurality of power conversion devices operating in parallel to supply power to a load, cross current of a fundamental component and a harmonic component can be suppressed without detecting load current. The power conversion system thus can stably supply appropriate current to the load even when the number of devices operating in parallel changes. According to the present disclosure, such a power conversion system can be implemented without providing a higher-level control device centrally controlling a plurality of power conversion devices and a master power conversion device of a plurality of power conversion devices.

DESCRIPTION OF EMBODIMENTS

Embodiments of the present invention will be described below with reference to the drawings. In the following drawings, the same or corresponding parts are denoted by the same reference signs and a description thereof will not be repeated.

First Embodiment (Configuration of Power Conversion System)

Figure 1:
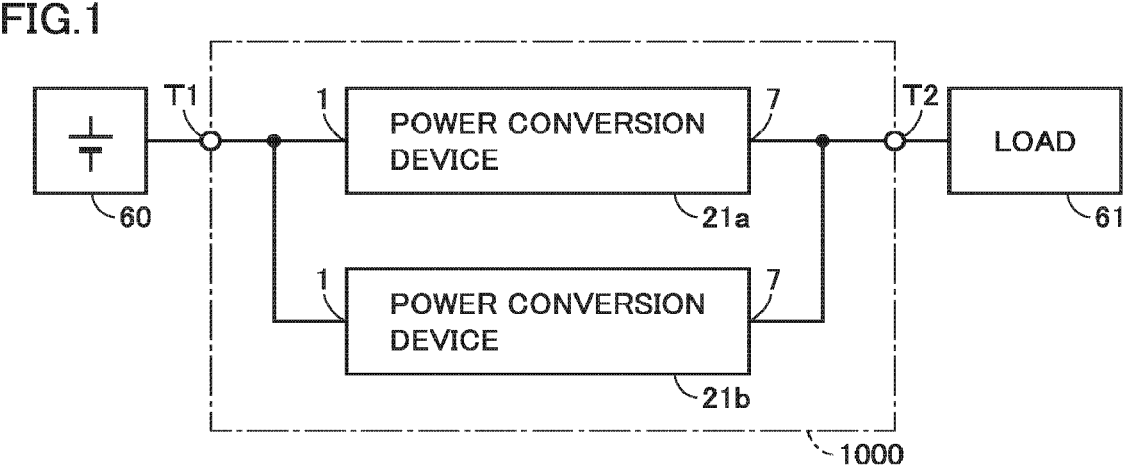
FIG. 1 is a diagram schematically showing a configuration example of a power conversion system having power conversion devices according to an embodiment of the present invention.
Figure 2:
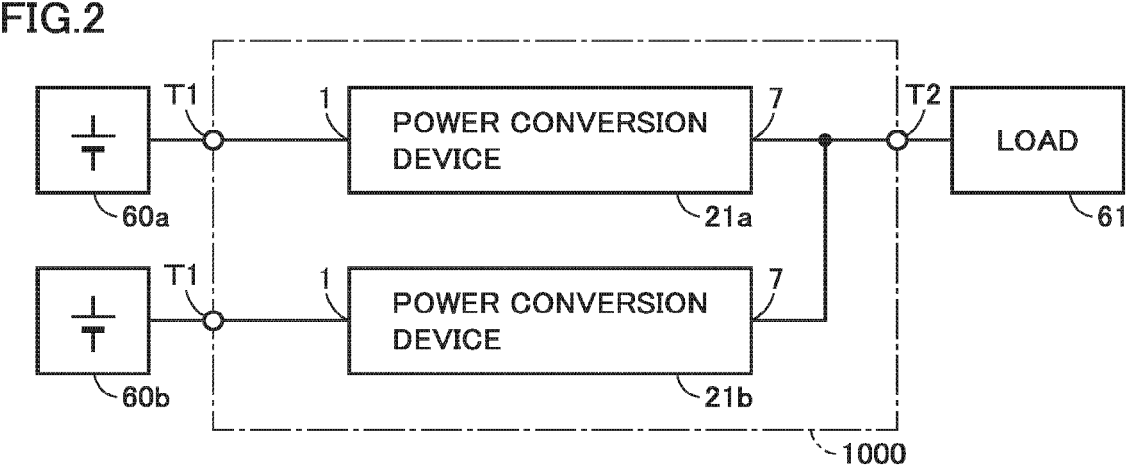
FIG. 2 is a diagram schematically showing a configuration example of the power conversion system having power conversion devices according to the embodiment of the present invention.

FIG. 1 and FIG. 2 are diagrams schematically showing a configuration example of a power conversion system having power conversion devices according to a first embodiment of the present invention.

Referring to FIG. 1 and FIG. 2, a power conversion system 1000 according to the present embodiment includes a plurality of power conversion devices connected in parallel with a load 61. Since a plurality of power conversion devices operate in parallel, power conversion system 1000 can supply combined output powers of the power conversion devices to load 61. Power conversion system 1000 may further include a device (for example, power generator) connected in parallel with the power conversion devices and having frequency droop characteristics for output power.

In a first configuration example shown in FIG. 1, power conversion system 1000 includes two power conversion devices 21a, 21b connected in parallel with load 61. A common DC power supply 60 is connected to two power conversion devices 21a, 21b through input terminals T1. DC power supply 60 supplies DC power to power conversion devices 21a, 21b. Each of power conversion devices 21a, 21b is configured to convert DC power supplied from DC power supply 60 into AC power.

Load 61 is driven by AC power supplied from power conversion devices 21a, 21b through an output terminal T2. In the present embodiment, it is assumed that when both power conversion devices 21a, 21b are normal, power conversion devices 21a, 21b supply AC power equal to each other to load 61.

A second configuration example shown in FIG. 2 differs from the first configuration example in FIG. 1 in that DC power supplies 60a, 60b are connected corresponding to power conversion devices 21a, 21b, respectively. Each of power conversion devices 21a, 21b is configured to convert DC power supplied from the corresponding DC power supply 60a, 60b into AC power.

In the configuration examples in FIG. 1 and FIG. 2, two power conversion devices are connected in parallel. However, three or more power conversion devices may be connected in parallel. A plurality of power conversion devices 21a, 21b basically have the same configuration. Hereinafter a plurality of power conversion devices 21a, 21b are simply called power conversion device 21 when collectively referred to. Similarly, a plurality of DC power supplies 60a, 60b connected corresponding to a plurality of power conversion devices 21a, 21b, respectively, are simply called DC power supply 60 when collectively referred to.

(Configuration of Power Conversion Device)

Figure 3:
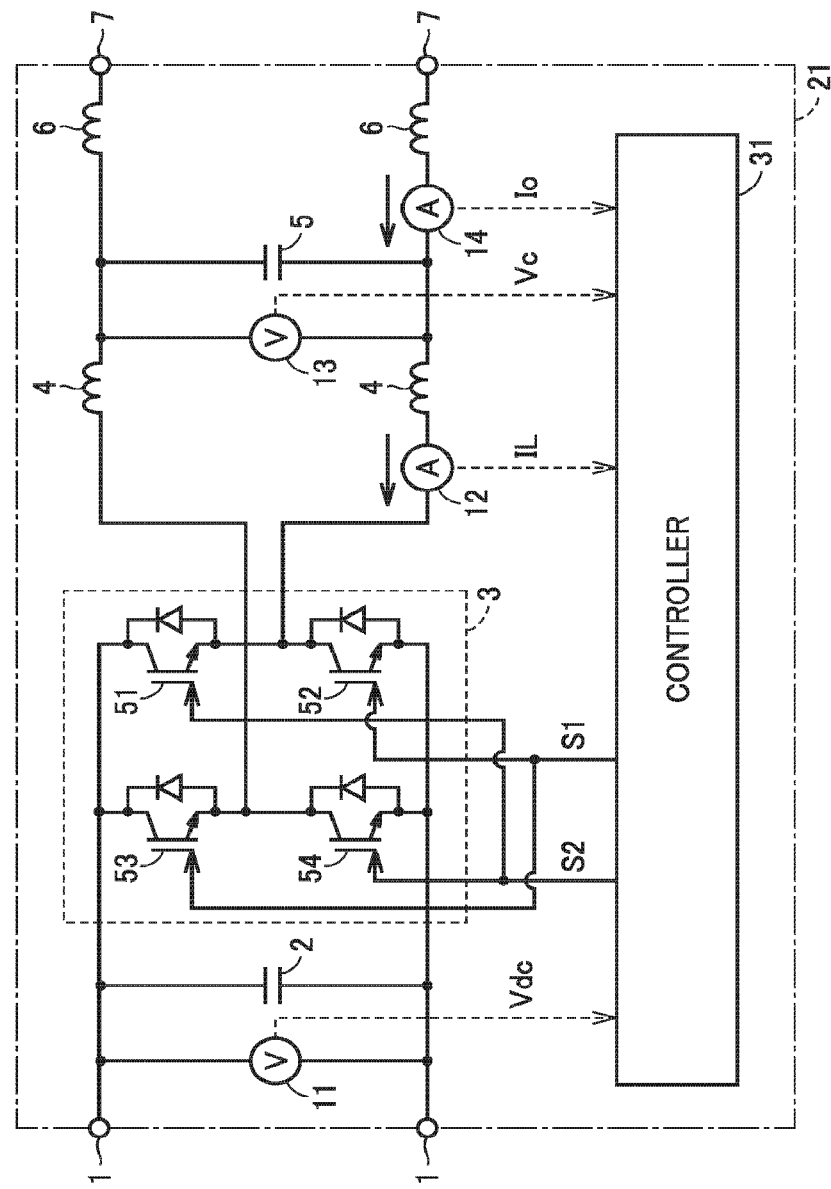
FIG. 3 is a diagram schematically showing a configuration of the power conversion device shown in FIG. 1 and FIG. 2.

FIG. 3 is a diagram schematically showing a configuration of power conversion device 21 shown in FIG. 1 and FIG. 2. Referring to FIG. 3, power conversion device 21 includes input terminals 1, a DC bus capacitor 2, a switching element unit 3, filter reactors 4, a filter capacitor 5, output reactors 6, and output terminals 7. Power conversion device 21 further includes voltage sensors 11, 13, current sensors 12, 14, and a controller 31.

Input terminal 1 is connected to DC power supply 60 (FIG. 1 and FIG. 2). DC bus capacitor 2 is connected in parallel between input terminal 1 and switching element unit 3. DC bus capacitor 2 smooths voltage of DC power supply 60 input to input terminal 1.

The capacitance value of DC bus capacitor 2 is selected such that the terminal-to-terminal voltage of DC bus capacitor 2 is not smaller than a predetermined voltage at a sudden change in output of power conversion device 21. The predetermined voltage is the terminal-to-terminal voltage of DC bus capacitor 2 at which power conversion device 21 can output a normal voltage. For example, when output voltage of power conversion device 21 is 200 Vrms, the predetermined voltage is set to about 283 V equivalent to the amplitude of the output voltage.

Switching element unit 3 converts the terminal-to-terminal voltage of DC bus capacitor 2 into AC voltage in accordance with a voltage command. Specifically, switching element unit 3 is configured with a bridge single-phase inverter including four semiconductor switching elements 51 to 54. Switching element unit 3 has a first leg and a second leg connected in parallel. The first leg is configured such that semiconductor switching element 51 in the upper arm and semiconductor switching element 52 in the lower arm are connected in series. The second leg is configured such that semiconductor switching element 53 in the upper arm and semiconductor switching element 54 in the lower arm are connected in series.

Elements capable of switching on and off under PWM (Pulse Width Modulation) control, such as IGBTs (Insulated Gate Bipolar Transistors) or MOSFETs (Metal Oxide Semiconductor Field Effect Transistors), can be used as semiconductor switching elements 51 to 54. A diode is connected in anti-parallel with each of semiconductor switching elements 51 to 54.

The on/off of semiconductor switching elements 51 to 54 is controlled by control signals (hereinafter also referred to as "PWM signal") S1, S2 generated by controller 31, whereby switching element unit 3 deforms voltage (that is, DC bus voltage Vdc) of DC power supply 60 supplied from input terminal 1 into a pulse-like voltage. Specifically, semiconductor switching elements 51, 54 are turned on or off in accordance with PWM signal S1, and semiconductor switching elements 52, 53 are turned on or off in accordance with PWM signal S2.

Although in FIG. 3, switching element unit 3 is configured with a single-phase inverter to supply single-phase AC power to single-phase load 61. However, switching element unit 3 may be configured with a three-phase inverter to supply three-phase AC power to a three-phase load.

The AC output terminal of switching element unit 3 is connected to one terminal of filter reactor 4. Filter capacitor 5 is connected to the other terminal of filter reactor 4. Filter reactor 4 and filter capacitor 5 smooth output voltage of switching element unit 3. Filter reactor 4 and filter capacitor 5 reduce a harmonic component included in voltage of DC power supply 60 pulsed by switching element unit 3 to output voltage with a predetermined frequency component. The predetermined frequency component refers to, for example, a frequency range of electric system (for example, 50 Hz or 60 Hz).

Output reactor 6 is connected between the other terminal of filter reactor 4 and output terminal 7. Output reactor 6 suppresses a harmonic component of output current of power conversion device 21. The harmonic component is a component equivalent to the frequency at which semiconductor switching elements 51 to 54 included in switching element unit 3 perform switching operation.

In this way, the pulse-like voltage output from switching element unit 3 passes through filter reactor 4, filter capacitor 5, and output reactor 6 provided between switching element unit 3 and output terminal 7 and is thereby shaped into a sinusoidal voltage.

Voltage sensor 11 detects the terminal-to-terminal voltage (hereinafter also referred to as "DC bus voltage Vdc") of DC bus capacitor 2 and outputs a signal indicating the detected value to controller 31.

Current sensor 12 is connected between the AC output terminal of switching element unit 3 and filter reactor 4 to detect current flowing through filter reactor 4 (hereinafter referred to as "reactor current IL") and output a signal indicating the detected value to controller 31. Current sensor 12 may be connected between filter reactor 4 and filter capacitor 5.

Voltage sensor 13 detects the terminal-to-terminal voltage of filter capacitor 5 (hereinafter also referred to as "output voltage Vc" of power conversion device 21) and outputs a signal indicating the detected value to controller 31. In the present embodiment, assuming that a voltage drop in output reactor 6 is small, the terminal-to-terminal voltage of filter capacitor 5 is regarded as output voltage Vc of power conversion device 21. Voltage sensor 13 may be connected between output reactor 6 and output terminal 7.

Current sensor 14 is connected between filter capacitor 5 and output reactor 6 to detect current flowing through output reactor 6 (hereinafter also referred to as "output current Io" of power conversion device 21) and output a signal indicating the detected value to controller 31. Current sensor 14 may be connected between output reactor 6 and output terminal 7.

Controller 31 generates PWM signals S1, S2 for controlling switching element unit 3, based on the detection signals from current sensors 12, 14 (the detected values of reactor current IL and output current Io) and the detection signals from voltage sensors 11, 13 (the detected values of DC bus voltage Vdc and output voltage Vc).

(Configuration of Controller 31)

Figure 4:
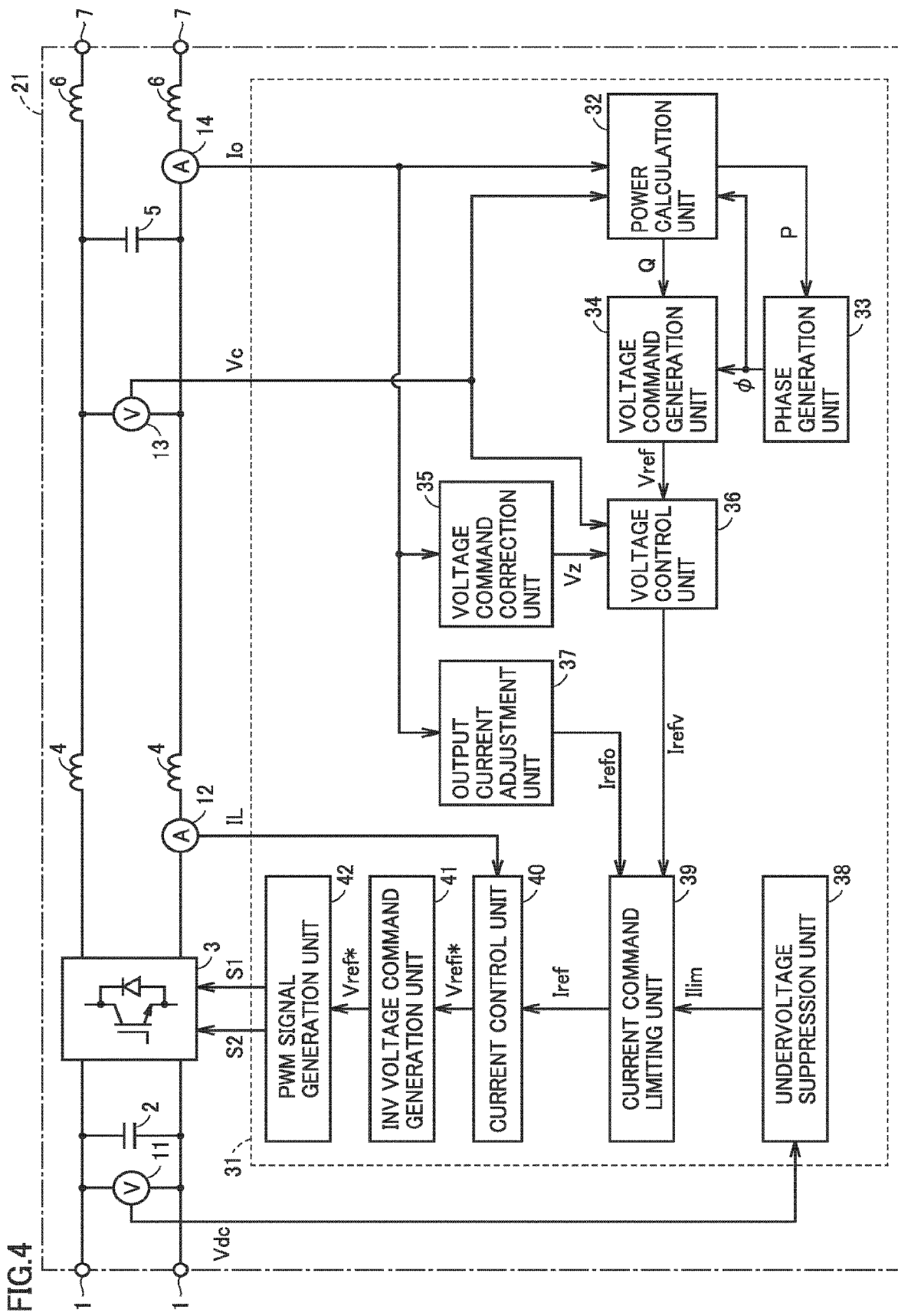
FIG. 4 is a functional block diagram illustrating an overall configuration of a control unit shown in FIG. 3.

FIG. 4 is a functional block diagram illustrating an overall configuration of controller 31 shown in FIG. 3. Referring to FIG. 4, controller 31 includes a power calculation unit 32, a phase generation unit 33, a voltage command generation unit 34, a voltage command correction unit 35, a voltage control unit 36, an output current adjustment unit 37, an undervoltage suppression unit 38, a current command limiting unit 39, a current control unit 40, an INV voltage command generation unit 41, and a PWM signal generation unit 42. Controller 31 shown in FIG. 4 may be configured with hardware or may be configured with software. Alternatively, controller 31 may be configured as a combination of hardware and software.

Referring to FIG. 5 to FIG. 20, the internal configuration of each unit in controller 31 will be described in detail below. In the present embodiment, the configuration in which controller 31 generates a PWM signal by a bipolar modulation method is described. However, a PWM signal may be generated by any other modulation method such as unipolar modulation method.

(1) Power Calculation Unit 32

Figure 5:
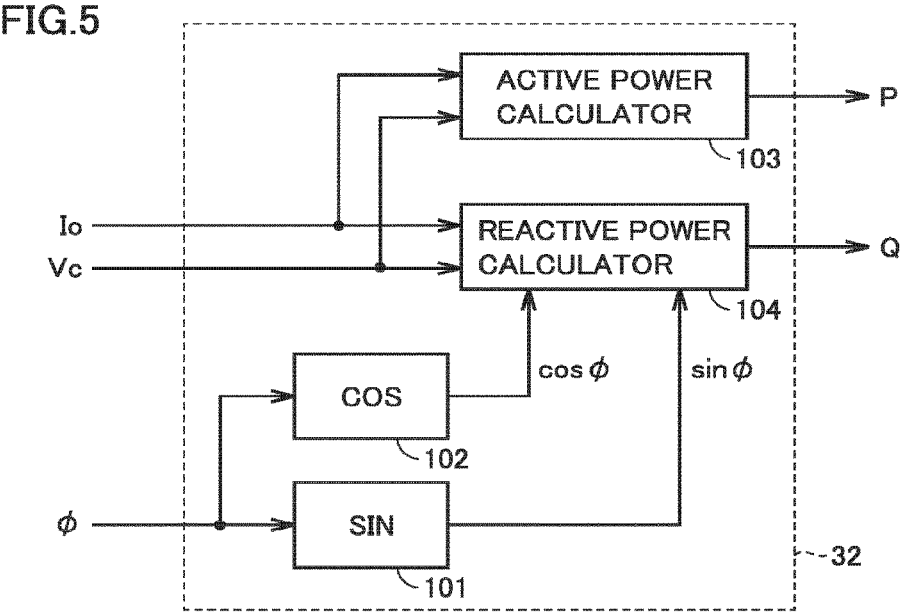
FIG. 5 is a block diagram showing an internal configuration of a power calculation unit shown in FIG. 4.

FIG. 5 is a block diagram showing an internal configuration of power calculation unit 32 shown in FIG. 4. Referring to FIG. 5, power calculation unit 32 receives the detected value of output voltage Vc detected by voltage sensor 13, the detected value of output current Io detected by current sensor 14, and internal phase φ generated by phase generation unit 33. Power calculation unit 32 is configured to calculate active power P and reactive power Q output by power conversion device 21, based on output voltage Vo, output current Io, and internal phase φ.

Specifically, power calculation unit 32 includes a sine wave generator (SIN) 101, a cosine wave generator (COS) 102, an active power calculator 103, and a reactive power calculator 104.

Sine wave generator 101 receives internal phase φ and outputs a sine wave sin φ. Cosine wave generator 102 receives internal phase φ and outputs cosine wave cos φ.

Active power calculator 103 calculates active power P output by power conversion device 21, based on output voltage Vc and output current Io. Specifically, active power calculator 103 calculates the average in a period of output voltage Vc for the product of output voltage Vc and output current Io (=Vo×Io). Alternatively, active power calculator 103 may perform filter processing such as a low-pass filter for the product of output voltage Vc and output current Io (=Vc×Io). The internal configuration of active power calculator 103 will be described later with reference to FIG. 6.

Reactive power calculator 104 calculates reactive power Q output by power conversion device 21, based on output voltage Vc, output current Io, sine wave sin φ, and cosine wave cos φ. The internal configuration of reactive power calculator 104 will be described later with reference to FIG. 7 to FIG. 11.

(1-1) Active Power Calculator 103

Figure 6:
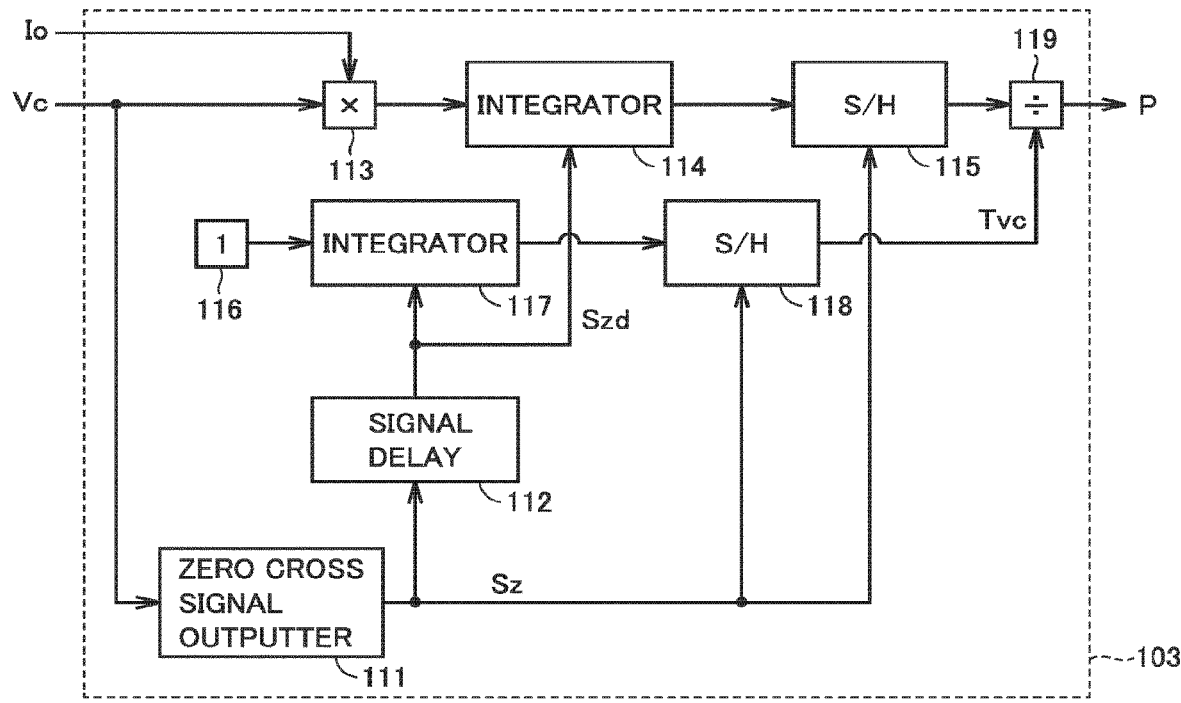
FIG. 6 is a block diagram showing an internal configuration of an active power calculator shown in FIG. 5.

FIG. 6 is a block diagram showing an internal configuration of reactive power calculator 103 shown in FIG. 5. Reactive power calculator 103 is configured to receive output voltage Vc and output current Io and perform calculation shown in Equation (1) below to determine active power P.

$$P = \frac{Tc}{Tvc} \times \sum_{n=1}^{m} (Io_n \times Vc_n) \quad (1)$$

Here, Tvc is the period of output voltage Vc, Tc is the calculation period, m is the number of calculations the processing of calculation period Tc is performed during the period Tvc, n is the number of calculations from the zero cross of Vc (n=1 is the earliest, n=m is the most recent, n corresponds to the calculation step at present), Vcn is output voltage Vc in the calculation step at present, and Ion is output current Io in the calculation step at present.

Referring to FIG. 6, active power calculator 103 includes a zero-cross signal outputter 111, a signal delay 112, a multiplier 113, integrators 114, 117, sample and holds (S/H) 115, 118, a fixed signal outputter 116, and a divider 119.

Zero-cross signal outputter 111 receives the detected value of output voltage Vc detected by voltage sensor 13. Zero-cross signal outputter 111 outputs a positive zero-cross signal Sz when output voltage Vc is positive, and outputs a negative zero-cross signal Sz when output voltage Vc is negative. Zero-cross signal Sz is input to signal delay 112 and sample and holds 115, 118.

A plurality of zero-cross signals Sz may be detected (called chattering) for a short time (for example, shorter than 5 ms) in some cases, due to fluctuation in output voltage Vc. To cope with such chattering, zero-cross signal outputter 111 may be configured such that when zero cross is detected, detection of zero cross is masked (that is, zero-cross signal Sz is not changed) for a certain time (for example, 5 ms). Alternatively, hysteresis may be provided in determination as to whether output voltage Vc is positive or negative. For example, zero-cross signal outputter 111 determines that output voltage Vc is positive when output voltage Vc>1 V, and determines that output voltage Vc is negative when output voltage Vc<−1 V.

Signal delay 112 receives zero-cross signal Sz and delays zero-cross signal Sz for a period of time corresponding to one calculation step of active power calculator 103. Signal delay 112 outputs the delayed zero-cross signal Sz (hereinafter also referred to as "delayed zero-cross signal Szd") to integrators 114, 117. Delayed zero-cross signal Szd serves as a reset signal for resetting the operation of integrators 114, 117.

That is, signal delay 112 delays the reset signal for integrators 114, 117 (delayed zero-cross signal Szd) relative to a signal (zero-cross signal Sz) input to sample and holds 115, 118. This ensures the order in operation of sample and hold of outputs of integrators 114, 117 performed in response to zero-cross signal Sz and reset in integrators 114, 117.

Fixed signal outputter 116 outputs a fixed value of signal value "1". This signal is integrated in integrator 117. The integrated value of integrator 117 is the elapsed time in measuring the period of output voltage Vc. Specifically, integrator 117 receives the output of fixed signal outputter 116 (signal value "1") and delayed zero-cross signal Szd and outputs the period measurement value of output voltage Vc obtained by integrating signal value "1". When delayed zero-cross signal Szd changes from negative to positive, integrator 117 resets the integrated value to zero and starts integrating the output of fixed signal outputter 116. Integrator 117 integrates the value obtained by multiplying the output of fixed signal outputter 116 within the time of one calculation step, for each calculation step. Accordingly, the output of integrator 117 is the elapsed time since the timing when delayed zero-cross signal Szd changes from negative to positive.

Sample and hold 118 receives the output of integrator 117 and zero-cross signal Sz and outputs period Tvc of output voltage Vc. Sample and hold 118 updates the output of sample and hold 118 to the output of integrator 117 at the timing when zero-cross signal Sz changes from negative to positive. At any other timing, the output of sample and hold 118 does not change. With this operation, the period in which output voltage Vc changes from negative to positive can be measured.

Multiplier 113 receives output voltage Vc and output current Io and outputs the multiplication result (Vc×Io) thereof.

Integrator 114 receives the output (Vc×Io) of multiplier 113 and delayed zero-cross signal Szd and outputs the integrated value of output of multiplier 113.

Integrator 114 integrates the value obtained by multiplying the output of multiplier 113 within the time of one calculation step, for each calculation step. In integrator 114, the integrated value is reset at the timing when delayed zero-cross signal Szd changes from negative to positive.

Sample and hold 115 receives the output of integrator 114 and zero-cross signal Sz and updates the output of sample and hold 115 to the output of integrator 114 at the timing when zero-cross signal Sz changes from negative to positive. At any other timing, the output of sample and hold 115 does not change.

Divider 119 receives the output of sample and hold 115 and period Tvc of output voltage Vc and outputs the result obtained by dividing the output of sample and hold 115 by period Tvc of output voltage Vc. In divider 119, a lower limit value of period Tvc of output voltage Vc may be provided in order to prevent an infinite division result when period Tvc of output voltage Vc is zero.

(1-2) Reactive Power Calculator 104

Figure 7:
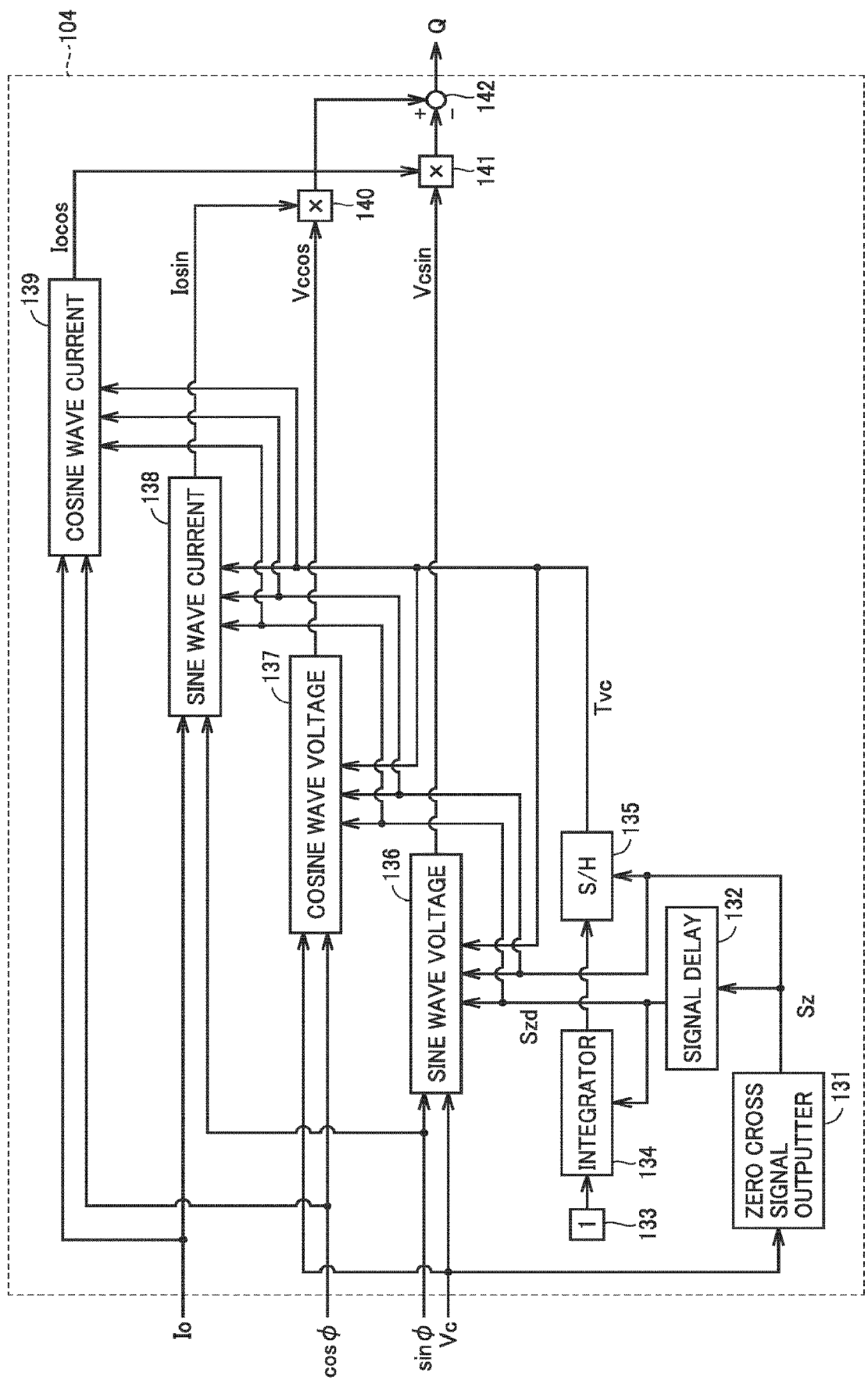
FIG. 7 is a block diagram showing an internal configuration of a reactive power calculator shown in FIG. 5.

FIG. 7 is a block diagram showing an internal configuration of reactive power calculator 104 shown in FIG. 5. Reactive power calculator 104 is configured to calculate reactive power Q output by power conversion device 21, based on output current Io, output voltage Vc, sine wave sin φ, and cosine wave cow.

Reactive power Q is reactive power (hereinafter also referred to as "fundamental reactive power") of frequency component of internal phase φ included in output power of power conversion device 21. The calculation of reactive power Q is to determine the polarity and the magnitude of reactive power at a particular frequency. Here, as illustrated in Equation (2) below, reactive power Q is calculated from the discrete Fourier transform result of output voltage Vc and output current Io for the frequency component of internal phase φ.

$$Q = Vc \sin \times Io \cos - Vc \cos \times Io \sin \quad (2)$$

Vcsin, Vccos, Iosin, and Iocos in Equation (2) are given by Equations (3) to (6) below.

$$Vc \sin = \frac{Tc \times \sqrt{2}}{Tvc} \times \sum_{n=1}^{m} (Vc_n \times \sin \phi_n) \quad (3)$$

$$Vc \cos = \frac{Tc \times \sqrt{2}}{Tvc} \times \sum_{n=1}^{m} (Vc_n \times \cos \phi_n) \quad (4)$$

$$Io \sin = \frac{Tc \times \sqrt{2}}{Tvc} \times \sum_{n=1}^{m} (Io_n \times \sin \phi_n) \quad (5)$$

$$Io \cos = \frac{Tc \times \sqrt{2}}{Tvc} \times \sum_{n=1}^{m} (Io_n \times \cos \phi_n) \quad (6)$$

Here, Tvc is the period of output voltage Vc, Tc is the calculation period, m is the number of calculations the processing of calculation period Tc is performed during period TVc, n is the number of calculations since zero cross of Vc (n=1 is the earliest, n=m is the most recent, and n corresponds to the calculation step at present), Vcn is output voltage Vc in the calculation step at present, Ion is output current Io in the calculation step at present, and φn is internal phase φ in the calculation step at present. Vcsin is the fundamental sine wave effective value component of output voltage Vc, Vccos is the fundamental cosine wave effective value component of output voltage Vc, Iosin is the fundamental sine wave effective value component of output current Io, and Iocos is the fundamental cosine wave effective value component. Fundamental reactive power Q is positive in the direction in which power conversion device 21 outputs reactive power with a phase lead.

Referring to FIG. 7, reactive power calculator 104 includes a zero-cross signal outputter 131, a signal delay 132, a fixed signal outputter 133, an integrator 134, a sample and hold 135, a sine wave voltage measurer 136, a cosine wave voltage measurer 137, a sine wave current measurer 138, a cosine wave current measurer 139, multipliers 140, 141, and a subtractor 142. Although positive and negative signals are used in the following description, H (logic high) and L (logic low) signals may be used.

The basic configuration of zero-cross signal outputter 131 is the same as that of zero-cross signal outputter 111 shown in FIG. 6. That is, zero-cross signal outputter 131 receives the detected value of output voltage Vc detected by voltage sensor 13. Zero-cross signal outputter 131 outputs positive zero-cross signal Sz when output voltage Vc is positive, and outputs negative zero-cross signal Sz when output voltage Vc is negative. Zero-cross signal Sz is input to signal delay 132 and sample and hold 135.

The basic configuration of signal delay 132 is the same as that of signal delay 112 shown in FIG. 6. That is, signal delay 132 receives zero-cross signal Sz and delays zero-cross signal Sz by the amount of time corresponding to one calculation step of reactive power calculator 104. Signal delay 132 outputs the delayed zero-cross signal Sz (delayed zero-cross signal Szd) to integrator 134. Signal delay 132 further outputs delayed zero-cross signal Szd to sine wave voltage measurer 136, cosine wave voltage measurer 137, sine wave current measurer 138, and cosine wave current measurer 139.

The basic configuration of fixed signal outputter 133 is the same as that of fixed signal outputter 116 shown in FIG. 6. That is, fixed signal outputter 133 outputs a fixed value of signal value "1". This signal is integrated in integrator 134.

The integrated value of integrator 134 is the elapsed time in measuring the period of output voltage Vc.

The basic configuration of integrator 134 is the same as that of integrator 117 shown in FIG. 6. That is, integrator 134 receives the output of fixed signal outputter 133 (signal value "1") and delayed zero-cross signal Szd and outputs the period measurement value of output voltage Vc that is the integrated value of signal value "1". When delayed zero-cross signal Szd changes from negative to positive, integrator 134 resets the integrated value to zero and starts integrating output of fixed signal outputter 116. Integrator 134 integrates the value obtained by multiplying the output of fixed signal outputter 134 within the time of one calculation step, for each calculation step. Thus, the output of integrator 134 is the elapsed time since the timing when delayed zero-cross signal Szd changes from negative to positive.

The basic configuration of sample and hold 135 is the same as that of sample and hold 118 shown in FIG. 6. That is, sample and hold 135 receives the output of integrator 134 and zero-cross signal Sz and outputs period Tvc of output voltage Vc. Sample and hold 135 updates the output of sample and hold 135 to the output of integrator 134 at the timing when zero-cross signal Sz changes from negative to positive. At any other timing, the output of sample and hold 135 does not change. With this operation, the period in which output voltage Vc changes from negative to positive can be measured.

Sine wave voltage measurer 136 receives the detected value of output voltage Vc detected by voltage sensor 13, sine wave sin φ from sine wave generator 101 (FIG. 5), period Tvc of output voltage Vc, zero-cross signal Sz, and delayed zero-cross signal Szd. As will be described later with reference to FIG. 8, sine wave voltage measurer 136 calculates the sine wave sin φ component of output voltage Vc and substitutes the calculation result in Equation (3) above to calculate the fundamental sine wave effective value component Vcsin of output voltage Vc.

Cosine wave voltage measurer 137 receives the detected value of output voltage Vc detected by voltage sensor 13, cosine wave cos φ from cosine wave generator 102 (FIG. 5), period Tvc of output voltage Vc, zero-cross signal Sz, and delayed zero-cross signal Szd. As will be described later with reference to FIG. 9, cosine wave voltage measurer 137 calculates the cosine wave cow component of output voltage Vc and substitutes the calculation result in Equation (4) above to calculate the fundamental cosine wave effective value component Vccos of output voltage Vc.

Sine wave current measurer 138 receives the detected value of output current Io detected by current sensor 14, sine wave sin φ from sine wave generator 101 (FIG. 5), period Tvc of output voltage Vc, zero-cross signal Sz, and delayed zero-cross signal Szd. As will be described later with reference to FIG. 10, sine wave current measurer 138 calculates the sine wave sin φ component of output current Ioc and substitutes the calculation result in Equation (5) above to calculate fundamental sine wave effective value component Iosin of output current Io.

Cosine wave current measurer 139 receives the detected value of output current Io detected by current sensor 14, cosine wave cow from cosine wave generator 102 (FIG. 5), period Tvc of output voltage Vc, zero-cross signal Sz, and delayed zero-cross signal Szd. As will be described later with reference to FIG. 11, cosine wave current measurer 139 calculates the cosine wave cos φ component of output current Ioc and substitutes the calculation result in Equation (6) above to calculate the fundamental cosine wave effective value component Iocos of output current Io.

Figure 8:
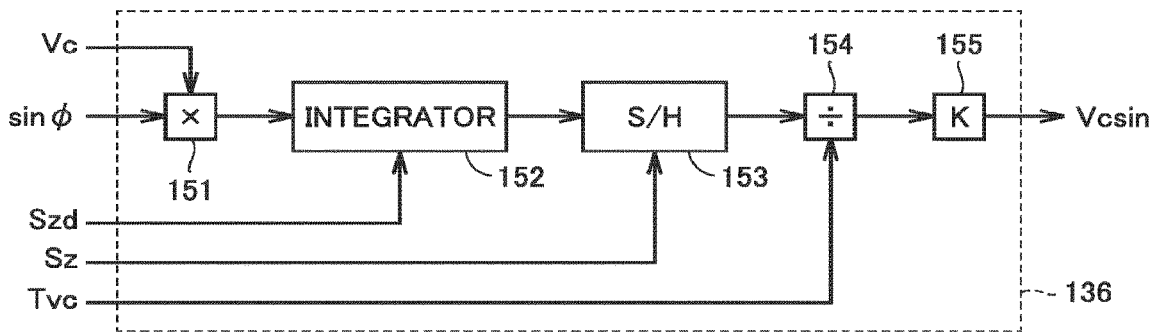
FIG. 8 is a block diagram showing an internal configuration of a sine wave voltage measurer shown in FIG. 7.

FIG. 8 is a block diagram showing an internal configuration of sine wave voltage measurer 136 shown in FIG. 7. Referring to FIG. 8, sine wave voltage measurer 136 includes a multiplier 151, an integrator 152, a sample and hold 153, a divider 154, and a gain 155.

Multiplier 151 receives the detected value of output voltage Vc detected by voltage sensor 13 and sine wave sin φ and outputs the multiplication result thereof (Vc×sin φ).

Integrator 152 receives the output (Vc×sin φ) of multiplier 151 and delayed zero-cross signal Szd and outputs the integrated value of output of multiplier 151. Integrator 152 integrates the value obtained by multiplying the output of multiplier 151 by one calculation step, for each calculation step. In integrator 152, the integrated value is reset at the timing when delayed zero-cross signal Szd changes from negative to positive.

Sample and hold 153 receives the output of integrator 152 and zero-cross signal Sz and updates the output of sample and hold 153 to the output of integrator 152 at the timing when zero-cross signal Sz changes from negative to positive. At any other timing, the output of sample and hold 153 does not change.

Divider 154 receives the output of sample and hold 153 and period Tvc of output voltage Vc and outputs the result obtained by dividing the output of sample and hold 153 by period Tvc of output voltage Vc. In divider 154, a lower limit value of period Tvc of output voltage Vc may be provided in order to prevent an infinite division result when period Tvc of output voltage Vc is zero.

Gain 155 receives the output of divider 154 and outputs the value obtained by multiplying the output of divider 154 by √2 as fundamental sine wave effective value component Vcsin of output voltage Vc.

Figure 9:
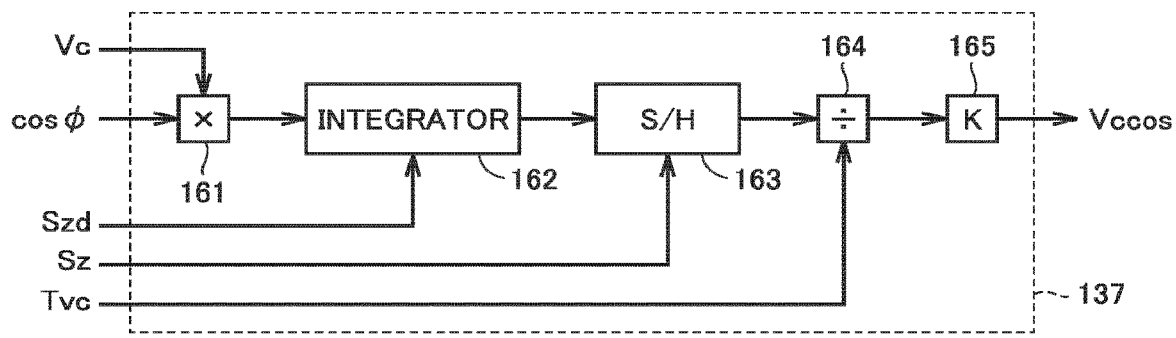
FIG. 9 is a block diagram showing an internal configuration of a cosine wave voltage measurer shown in FIG. 7.

FIG. 9 is a block diagram showing an internal configuration of cosine wave voltage measurer 137 shown in FIG. 7. Referring to FIG. 9, cosine wave voltage measurer 137 includes a multiplier 161, an integrator 162, a sample and hold 163, a divider 164, and a gain 165. The basic configuration of cosine wave voltage measurer 137 is the same as that of sine wave voltage measurer 136 shown in FIG. 8. The calculation of fundamental cosine wave effective value component Vccos of output voltage Vc is the same as the calculation of fundamental sine wave effective value component Vcsin of output voltage Vc described in FIG. 8 except that sine wave sin φ is changed to cosine wave cos φ, and a description thereof is not repeated.

Figure 10:
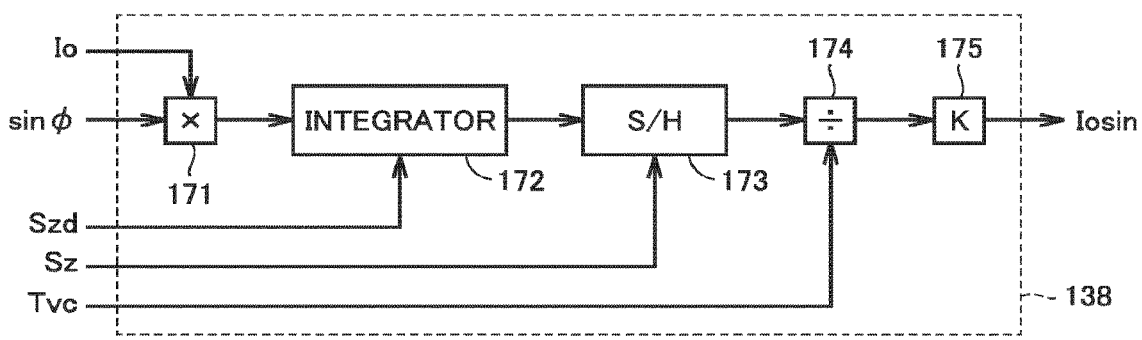
FIG. 10 is a block diagram showing an internal configuration of a sine wave current measurer shown in FIG. 7.

FIG. 10 is a block diagram showing an internal configuration of sine wave current measurer 138 shown in FIG. 7. Referring to FIG. 10, sine wave current measurer 138 includes a multiplier 171, an integrator 172, a sample and hold 173, a divider 174, and a gain 175. The basic configuration of sine wave current measurer 138 is the same as that of sine wave voltage measurer 136 shown in FIG. 8. The calculation of fundamental sine wave effective value component Iosin of output current Io is the same as the calculation of fundamental sine wave effective value component Vcsin of output voltage Vc described in FIG. 8 except that output voltage Vc is changed to output current Io, and a description thereof is not repeated.

Figure 11:
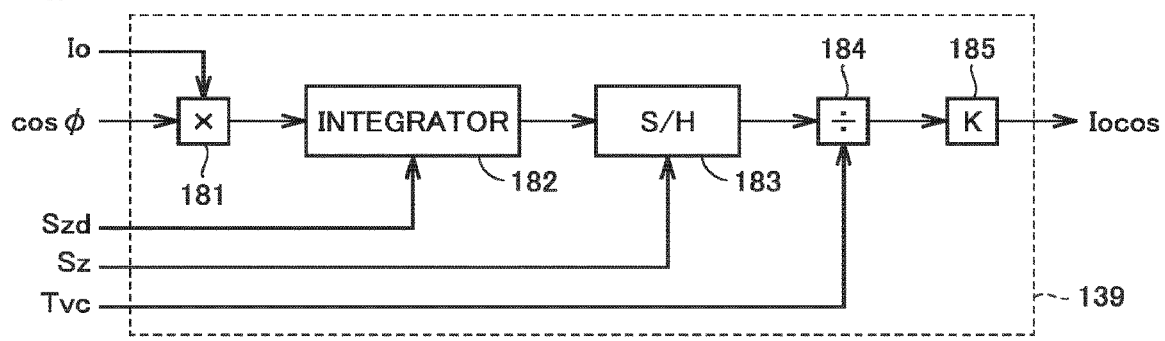
FIG. 11 is a block diagram showing an internal configuration of a cosine wave current measurer shown in FIG. 7.

FIG. 11 is a block diagram showing an internal configuration of cosine wave current measurer 139 shown in FIG. 7. Referring to FIG. 11, cosine wave current measurer 139 includes a multiplier 181, an integrator 182, a sample and hold 183, a divider 184, and a gain 185. The basic configuration of cosine wave current measurer 139 is the same as that of sine wave voltage measurer 136 shown in FIG. 8. The calculation of fundamental cosine wave effective value component Iocos of output current Io is the same as the calculation of fundamental sine wave effective value component Vcsin of output voltage Vc described in FIG. 8 except that output voltage Vc is changed to output current Io and sine wave sin φ is changed to cosine wave cow, and a description thereof is not repeated.

Returning to FIG. 7, multiplier 140 receives fundamental cosine wave effective value component Vccos of output voltage Vc and fundamental sine wave effective value component Iosin of output current Io and outputs the multiplication result thereof (Vccos×Iosin). Multiplier 141 receives fundamental sine wave effective value component Vcsin of output voltage Vc and fundamental cosine wave effective value component Iocos of output current Io and outputs the multiplication result thereof (Vcsin×Iocos).

Subtractor 142 subtracts the output (Vcsin×Iocos) of multiplier 141 from the output (Vccos×Iosin) of multiplier 140. That is, subtractor 142 performs the calculation of Equation (2) above to output fundamental reactive power Q.

(2) Phase Generation Unit 33

Figure 12:
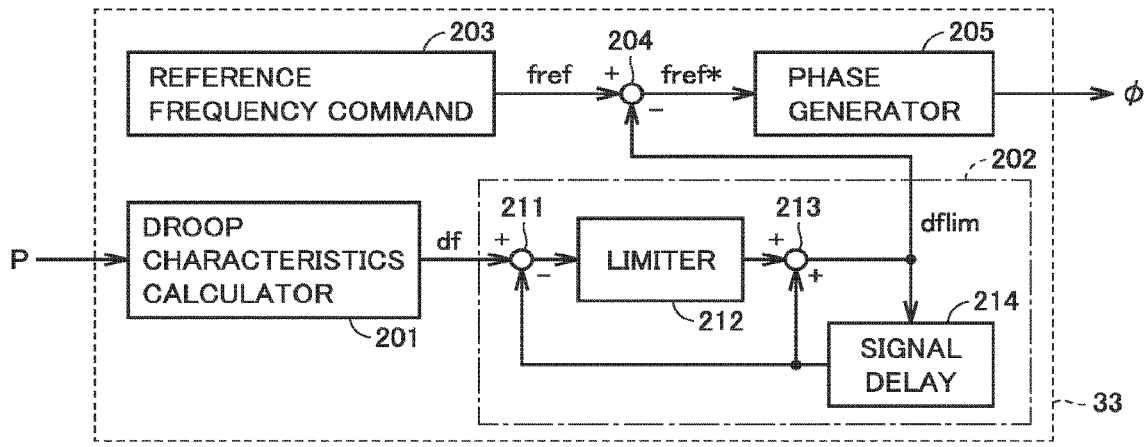
FIG. 12 is a block diagram showing an internal configuration of a phase generation unit shown in FIG. 4.

FIG. 12 is a block diagram showing an internal configuration of phase generation unit 33 shown in FIG. 4. Phase generation unit 33 receives active power P calculated by active power calculator 103 (FIG. 6) and outputs internal phase φ. Phase generation unit 33 is configured to change the frequency of output voltage Vc in accordance with active power P.

When a plurality of power conversion devices 21 operate in parallel as shown in FIG. 1 and FIG. 2, phase generation unit 33 is configured to correct a phase difference of output voltages Vc of power conversion devices 21. An error voltage produced due to the phase difference of output voltages Vc of power conversion devices 21 is mainly a cosine wave component. Thus, the error voltage of cosine wave component is applied to output reactor 6, and current determined by the error voltage and the impedance of output reactor 6 flows through a plurality of power conversion devices 21. Since this current flowing through power conversion devices 21 is mainly a sine wave component, cross current of active power occurs among power conversion devices 21. Phase generation unit 33 therefore detects active power output by power conversion device 21 and adjusts the frequency of output voltage Vc of power conversion device 21 in accordance with the detected value of active power, thereby correcting the phase difference of output voltage Vc and suppressing cross current of active power.

Referring to FIG. 12, phase generation unit 33 includes a droop characteristics calculator 201, a change limiter 202, a reference frequency command unit 203, a subtractor 204, and a phase generator 205.

Droop characteristics calculator 201 calculates frequency correction command df based on active power P from active power calculator 103. The relation between frequency correction command df and active power P is represented by Equation (7) below.

$$df = Kf \times P \quad (7)$$

Here, Kf shows the droop characteristic gain. In the present embodiment, frequency correction command df is calculated in proportion to active power P. However, frequency correction command df may be calculated by filtering active power P. Alternatively, frequency correction command df may be calculated using a differential element of active power P.

When the power capacity differs among a plurality of power conversion devices 21 operating in parallel and the ratio of active power P born for each power conversion device 21 is adjusted, droop characteristic gain Kf is adjusted in accordance with the ratio of active power P born by power conversion device 21. Alternatively, the active power born for each power conversion device 21 can be adjusted by setting a power command offset in active power P.

For example, when power conversion device 21a with large rated power and power conversion device 20b with small rated power operate in parallel, the proportion of output power to the rated power in each power conversion device 21 can be made uniform by adjusting the sharing ratio of active power of each power conversion device 21 in accordance with the magnitude of rated power (that is, adjusting droop characteristic gain Kf).

Specifically, it is assumed that the rated power of power conversion device 21a is 10 kW and the rated power of power conversion device 21b is 1 kW. If the sharing ratio of active power for each power conversion device 21 is equal, both of the output power of power conversion device 21a and the output power of power conversion device 21b are 1 kW when frequency change is Δf1, and power conversion device 21a outputs 10% of the rated power whereas power conversion device 21b outputs the rated power. In such a case, the sharing ratio of power between power conversion devices 21 is adjusted in accordance with the magnitude of the rated power, so that power conversion device 21a and power conversion device 21b can output the same proportion relative to the rated power. For example, when the frequency change is Δf1, the output power of power conversion device 21a is set to 10 kW, and the output power of power conversion device 21b is set to 1 kW, so that both of power conversion devices 21a and 21b output the rated power.

Alternatively, droop characteristic gain Kf may be adjusted in accordance with the characteristics of DC power supply 60 connected to power conversion device 21. For example, when DC power supply 60 is a common storage battery (for example, lithium ion battery, lead acid battery), droop characteristic gain Kf can be set in accordance with the remaining capacity of the storage battery.

Specifically, when the remaining capacity of the storage battery is low, droop characteristic gain Kf is set such that droop characteristic gain Kf on the discharge side is increased or droop characteristic gain Kf on the charge side is reduced. Alternatively, an offset is set such that reference frequency command fref is reduced. With this setting of an offset, droop characteristics calculator 201 outputs a positive offset. The setting of droop characteristic gain Kf on the discharge side, the setting of droop characteristic gain Kf on the charge side, and the setting of offset may be combined.

By contrast, when the remaining capacity of the storage battery is large, droop characteristic gain Kf is set in an opposite way to when the remaining capacity of the storage battery is small. That is, droop characteristic gain Kf is set such that droop characteristic gain Kf on the discharge side is reduced or droop characteristic gain Kf on the charge side is increased when the remaining capacity of the storage battery is large. Alternatively, an offset is set such that reference frequency command fref is increased. With the setting of offset, droop characteristics calculator 201 outputs a negative offset. The setting of droop characteristic gain Kf on the discharge side, the setting of droop characteristic gain Kf on the charge side, and the setting of offset may be combined.

By doing so, compared with when droop characteristic gain Kf is constant for the remaining capacity of the storage battery, power can be supplied to load 61 for a longer time in the parallel operation state. For example, it is assumed that two power conversion devices 21 with rated power of 1 kW operate in parallel to supply power to a load of 1.5 kW. In this case, when one of power conversion devices 21 stops due to running out of the capacity of DC power supply 60, it is difficult for the other power conversion device 21 alone to supply power to load 61. As described above, such inconvenience can be avoided by adjusting the sharing ratio of active power for each power conversion device 21 in accordance with the remaining capacity of DC power supply 60, and the parallel operation of two devices can continue for a longer time.

Change limiter 202 is configured to limit the change ratio of frequency correction command df output from droop characteristics calculator 51. The change ratio of frequency correction command df corresponds to the amount of change in frequency per unit time. Change limiter 202 outputs the limited frequency correction command df (hereinafter also referred to as "frequency correction command dflim") to subtractor 204.

The meaning of provision of change limiter 202 in phase generation unit 33 is described below.

In power conversion system 1000 shown in FIG. 1 and FIG. 2, a plurality of power conversion devices 21 may be interconnected with another power conversion device (not shown) that converts power generated by a distributed power supply such as solar power generation into commercial power.

Such a power conversion device for distributed power supply has an islanding detecting function. The islanding detecting function is configured to determine islanding based on a change in frequency of system voltage of interconnected power conversion devices. Thus, when power conversion device 21 is interconnected with a separate power conversion device for distributed power supply, a sudden change in frequency of system voltage in accordance with frequency correction command df may cause the power conversion device for distributed power supply to erroneously detect islanding and stop the operation. In order to prevent such a detection error, in the present embodiment, change limiter 202 for limiting the change ratio of frequency correction command df is provided.

In some power conversion devices for distributed power supply, Fault Ride

Through is employed in order to prevent simultaneous disconnection to keep operation for system disturbance such as instantaneous voltage drop and instantaneous power failure. A power conversion device with Fault Ride Through is required to continue operation for a ramp-shaped frequency change ratio 2 Hz/s. It is therefore effective to set the upper limit of change ratio in change limiter 202 to 2 Hz/s or less and set the lower limit value of change ratio to −2 Hz/s or more.

In the future, the request for power conversion devices for distributed power supply is thought to change with the background of electric supply and demand of power systems. In this case, it is effective to set the upper limit value and the lower limit value of change limiter 202 in response to the request for power conversion devices for distributed power supply.

As shown in FIG. 12, change limiter 202 includes a subtractor 211, a limiter 212, an adder 213, and a signal delay 214.

Subtractor 211 subtracts the output of signal delay 214 from frequency correction command df from droop characteristics calculator 201. The output of signal delay 214 corresponds to the previous frequency correction command. Subtractor 211 outputs the subtraction result (frequency correction command df—previous frequency correction command) to limiter 212. The subtraction result is the amount of change per calculation step of frequency correction command df (calculation step of phase generation unit 33).

Limiter 212 outputs a value obtained by limiting the amount of change per one calculation step of frequency correction command df that is output from subtractor 211. The change ratio of frequency to be limited can be set with the upper limit value and the lower limit value of limiter 212. For example, when the change ratio of frequency correction command df is limited to ±2 Hz/s, the upper limit value of limiter 212 is set to 2×(one calculation step time of phase generation unit 33), and the lower limit value of limiter 212 is set to −2×(one calculation step time of phase generation unit 33).

Adder 213 receives the output of limiter 212 and the output of signal delay 214 (previous frequency correction command) and outputs the addition result thereof as limited frequency correction command dflim. This frequency correction command dflim is input to subtractor 204 and signal delay 214.

Signal delay 214 outputs a value obtained by delaying the input frequency correction command dflim by the amount of one calculation step of phase generation unit 33. This output corresponds to the previous frequency correction command.

Reference frequency command unit 203 outputs reference frequency command fref serving as a target value in frequency control of output voltage Vc of power conversion device 21. Reference frequency command fref is set to a common value among a plurality of power conversion devices 21.

Subtractor 204 subtracts frequency correction command dflim from reference frequency command fref and outputs the subtraction result (fref−dflim) as final frequency command fref* to phase generator 205.

Phase generator 205 integrates frequency command fref* output from subtractor 204 to generate internal phase φ of output voltage Vc of power conversion device 21.

Figure 13:
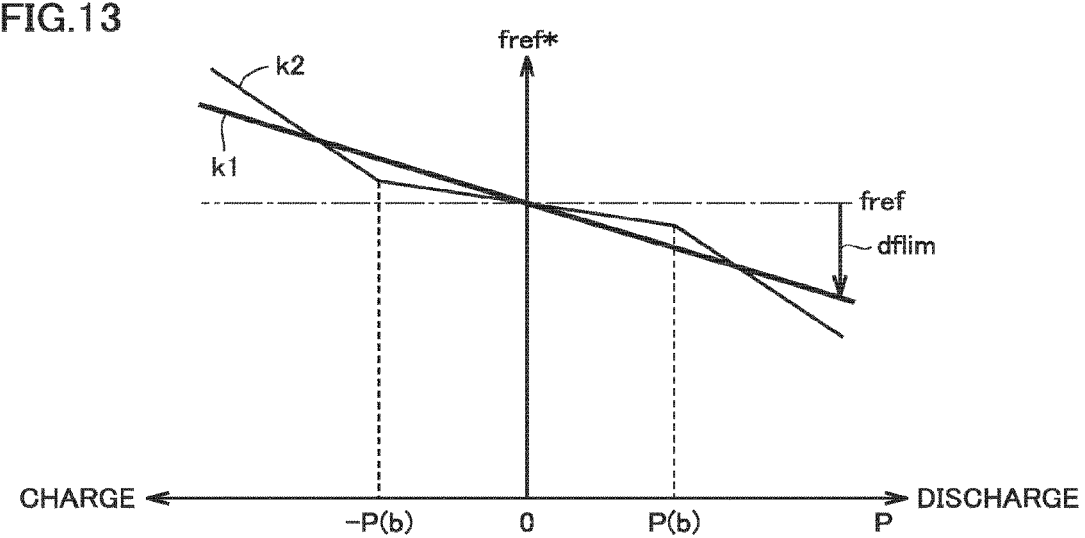
FIG. 13 is a diagram showing a droop characteristic example of a frequency command generated by the phase generation unit.

As describe above, phase generation unit 33 operates such that frequency command fref* has droop characteristics in accordance with active power P output by power conversion device 21. FIG. 13 illustrates a droop characteristics example of frequency command fref*. Frequency command fref* changes as illustrated by waveform k1 in FIG. 13. Specifically, when power conversion device 21 is outputting positive active power P to output terminal 7 (that is, power conversion device 21 is discharging), the frequency command fref* is reduced as the absolute value of active power P increases. On the other hand, when power conversion device 21 is outputting negative active power P to output terminal 7 (that is, when power conversion device 21 is charged), frequency command fref* is increased as the absolute value of active power P increases.

Alternatively, as illustrated by waveform k2 in FIG. 13, the gain may be changed in accordance with the magnitude of active power P output by power conversion device 21. For example, at a low load (about less than 30% or less than 50% of the rated power of power conversion device 21), the gain of frequency command fref* for active power P may be set to a first value, and at a high load (30% or more or 50% or more of the rated power of power conversion device 21), the gain of frequency command fref* for active power P may be set to a second value greater than the first value. In this way, the frequency change at a low load can be reduced by changing the gain in accordance with the magnitude of active power P.

(3) Voltage Command Generation Unit 34

Figure 14:
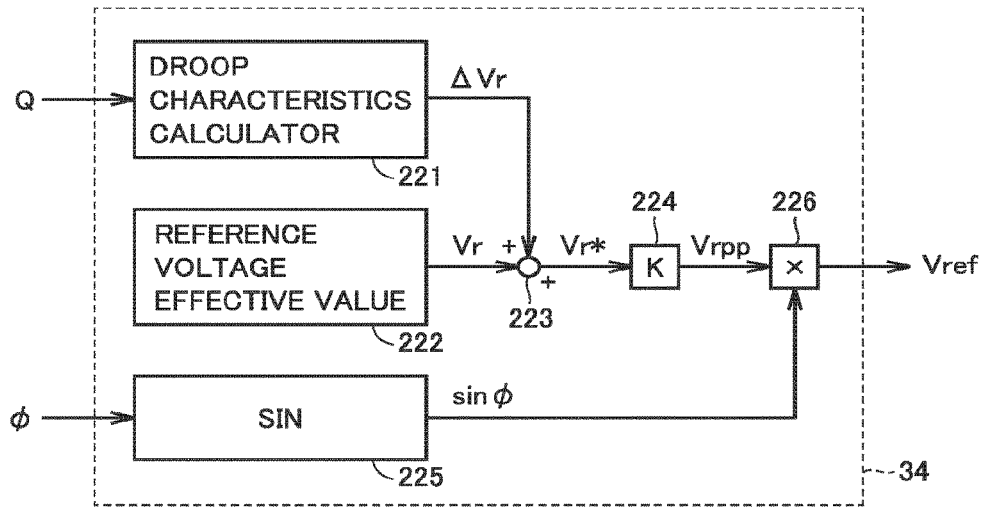
FIG. 14 is a block diagram showing an internal configuration of a voltage command generation unit shown in FIG. 4.

FIG. 14 is a block diagram showing an internal configuration of voltage command generation unit 34 shown in FIG. 4. Voltage command generation unit 34 is configured to receive fundamental reactive power Q calculated by reactive power calculator 104 (FIG. 7) and internal phase φ generated by phase generation unit 33 (FIG. 12) and output voltage command Vref which is a target value of output voltage Vc of power conversion device 21.

Referring to FIG. 14, voltage command generation unit 34 includes a droop characteristics calculator 221, a reference voltage commander 222, an adder 223, a gain 224, a sine wave generator (SIN) 225, and a multiplier 226.

Droop characteristics calculator 221 calculates correction amount ΔVr for reducing reactive power Q output by power conversion device 21, based on fundamental reactive power Q calculated by reactive power calculator 104. Specifically, the value obtained by multiplying fundamental reactive power Q by gain Kq is correction amount ΔVr (ΔVr=Q×Kq).

Here, it is assumed that gain Kq is set such that correction amount ΔVr of 0.05 p.u. is output for fundamental reactive power Q of 1 p.u. This case is equivalent to a state in which a reactance (inductance) component corresponding to 0.05 p.u. for a fundamental component is connected between switching element unit 3 and output terminal 7.

For example, in a case of a power conversion device of 200 Vrms at a rating of 1 kVA, gain Kq is set to 0.01 Vrms/Var (=200 Vrms×0.05 p.u.). Thus, correction amount ΔVr is output such that a voltage drop equivalent to a configuration in which a reactance of 2Ω (=200 Vrms×200 Vrms×0.05 p.u./1 kVA) is electrically connected between switching element unit 3 and filter capacitor 5.

Accordingly, when a plurality of power conversion devices 21 operate in parallel, larger gain Kq is set as the cross current of fundamental reactive power among power conversion devices 21 increases. The voltage error among power conversion devices 21 is thus reduced and consequently, the cross current of fundamental reactive power can be reduced.

When the share of fundamental reactive power varies among power conversion devices 21, for example, due to the effect of wiring impedance of each power conversion device 21, gain Kq may be adjusted for each power conversion device 21.

Reference voltage commander 222 outputs reference effective value Vr which is the effective value of reference voltage. Reference effective value Vr refers to an effective value of reference voltage common among a plurality of power conversion devices 21 operating in parallel, and a common constant value is applied to a plurality of power conversion devices 21.

Adder 223 adds correction amount ΔVr to reference effective value Vr and outputs the addition result (Vr+ΔVr) as effective voltage command Vr*. Gain 224 multiplies effective voltage command Vr* by √2 to generate voltage amplitude command Vrpp.

Multiplier 226 multiplies voltage amplitude command Vrpp by sine wave sin φ and outputs the multiplication result (Vrpp×sin φ) as voltage command Vref.

In parallel operation of a plurality of power conversion devices 21, if the voltage amplitude of output voltage Vc varies among amplitude power conversion devices 21, an error voltage due to the variation is applied to output reactor 6 and thus current due to the error voltage flows through a plurality of power conversion devices 21. In particular, since the error voltage due to variation in voltage amplitude is mainly a sinusoidal component, current of a cosine wave component flows through power conversion devices 21 when voltage of a since wave component is applied to output reactor 6. That is, as power, reactive power flows through power conversion devices 21 as cross current.

Figure 15:
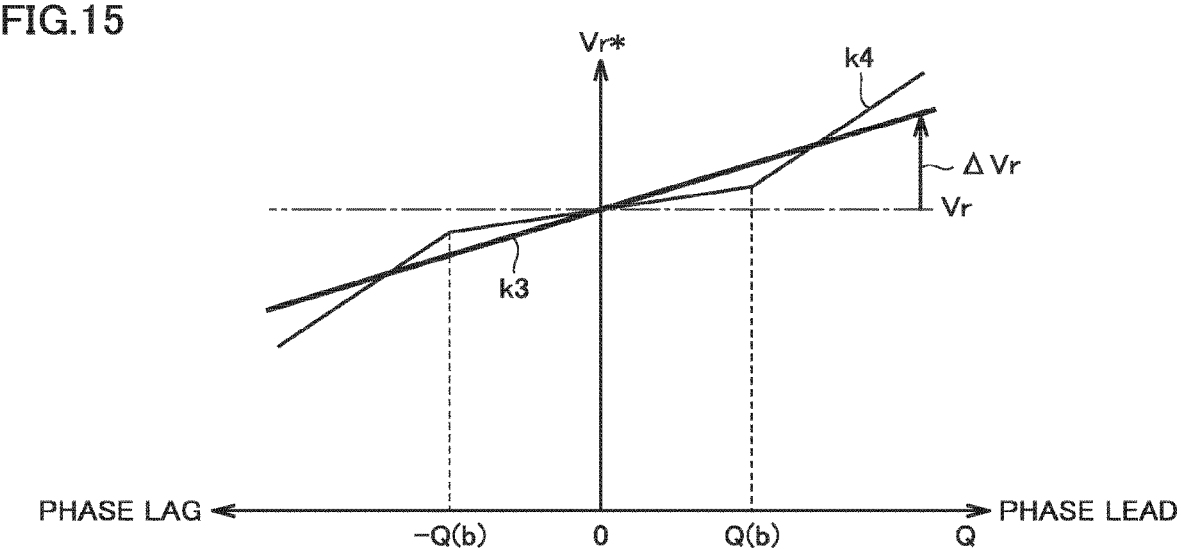
FIG. 15 is a diagram showing a droop characteristic example of an effective voltage command generated by the voltage command generation unit.

In the present embodiment, as described above, voltage command generation unit 34 has droop characteristics calculator 221 and generates effective voltage command Vr* having droop characteristics for reactive power Q such that reactive power Q decreases. FIG. 15 shows the droop characteristics example of effective voltage command Vr*. As illustrated by waveform k3 in FIG. 15, effective voltage command Vr* is obtained by adding the droop characteristics (correction amount ΔVr) for fundamental reactive power Q to reference effective value Vr.

Alternatively, as illustrated by waveform k4 in FIG. 15, the gain may be changed in accordance with the magnitude of reactive power Q output by power conversion device 21. For example, at a low load (about less than 30% or less than 50% of the rated power of power conversion device 21), gain Kq of correction amount ΔVr for reactive power Q may be set to a first value, and at a high load (30% or more or 50% or more of the rated power of power conversion device 21), gain Kq of correction amount ΔVr for reactive power Q may be set to a second value greater than the first value. In this way, voltage change at a low load can be reduced by changing gain Kq in accordance with the magnitude of reactive power Q.

(4) Voltage Command Correction Unit 35

Figure 16:
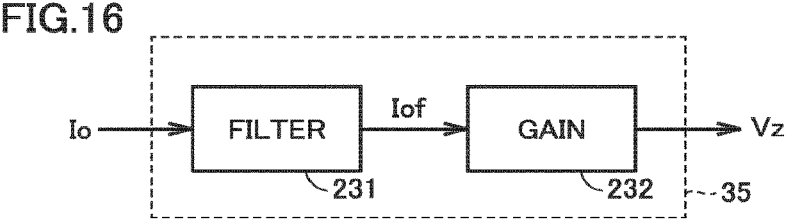
FIG. 16 is a block diagram showing an internal configuration of a voltage command correction unit shown in FIG. 4.
Figure 17:
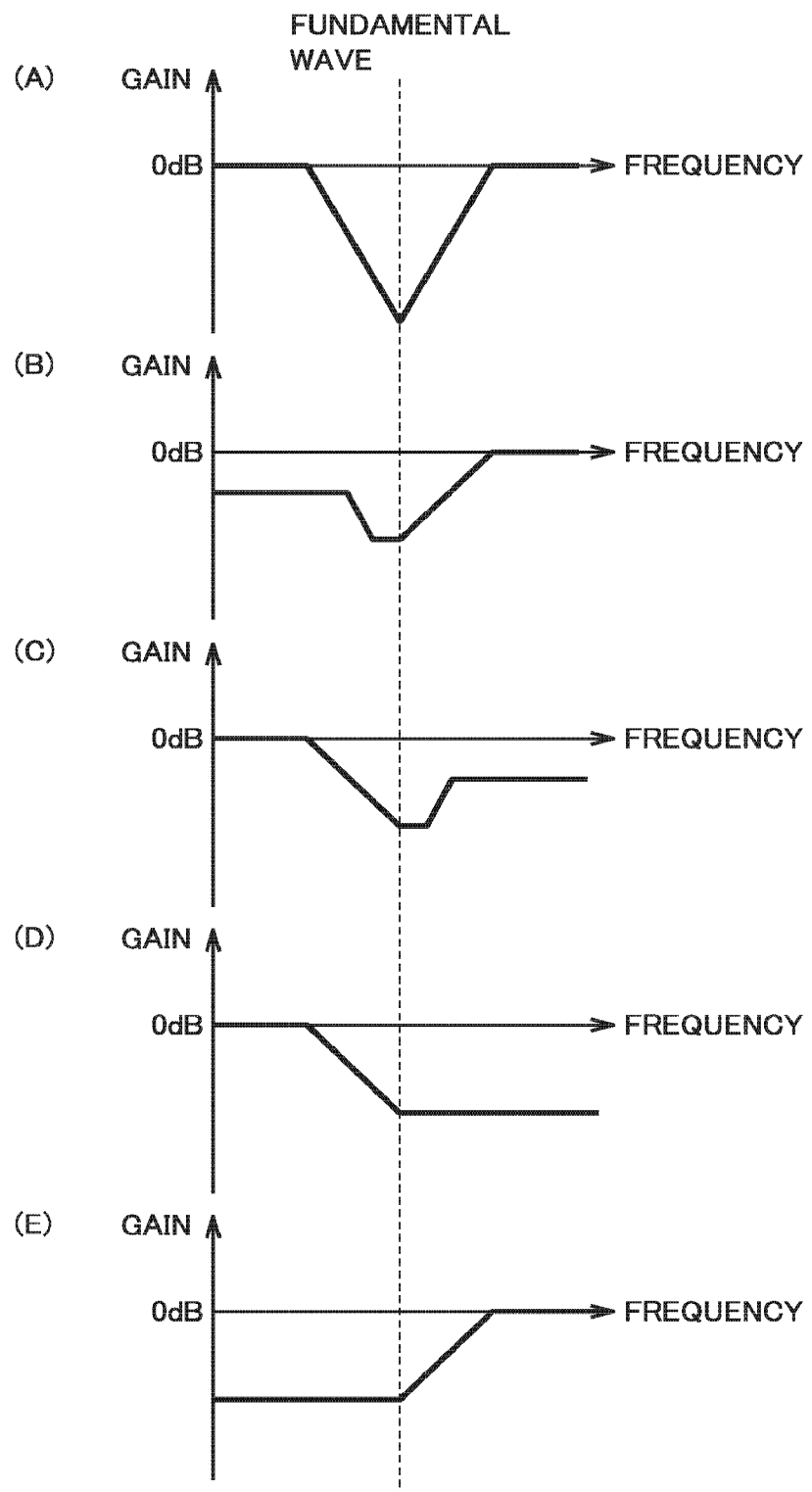
FIG. 17 is a diagram showing the frequency characteristics of a filter shown in FIG. 16.

FIG. 16 is a block diagram showing an internal configuration of voltage command correction unit 35 shown in FIG. 4. Voltage command correction unit 35 is configured to receive the detected value of output current Io detected by current sensor 14 and output voltage command correction amount Vz. Referring to FIG. 16, voltage command correction unit 35 includes a filter 231 and a gain 232.

Filter 231 is a filter for removing (or attenuating) a reference frequency component (fundamental component) of output current Io. Filter 231 may be any one of a configuration including a low-pass filter and a high-pass filter in combination, a configuration using a band-stop filter, a configuration using a phase compensator, and a configuration including the filters above in combination.

FIGS. 17(A) to 17(E) illustrate the frequency characteristics of filter 231. In the charts in FIG. 17(A) to 17(E), the horizontal axis shows frequency and the vertical axis shows gain.

In FIG. 17(A), a filter constant is set such that the gain of the fundamental component is reduced. By contrast, in FIG. 17(B), a filter constant is set such that the gain of the fundamental component is reduced and the gain at a frequency lower than the fundamental wave is lower than the gain at a frequency higher than the fundamental wave. On the other hand, in FIG. 17(C), a filter constant is set such that the gain of the fundamental component is reduced and the gain at a frequency higher than the fundamental wave is lower than the gain at a frequency lower than the fundamental wave.

In FIG. 17(D), a filter constant is set such that the gain at the fundamental wave and a frequency higher than the fundamental wave is reduced. On the other hand, in FIG. 17(E), the filter constant is set such that the gain at the fundamental wave and a frequency lower than the fundamental wave is reduced.

Filter 231 having any one of the frequency characteristics in FIG. 17(A) to 17(E) basically outputs output current Iof in which the reference frequency component (fundamental component) is attenuated from output current Io. When having the frequency characteristic in any one of FIG. 17(B) to 17(E), filter 231 outputs the reference frequency component (fundamental component) as well as output current Iof in which one of high frequency and low frequency components is attenuated from output current Io.

Returning to FIG. 16, gain 232 receives output current Iof output from filter 231 and outputs voltage command correction amount Vz. Specifically, gain 232 multiplies output current Iof by gain Kio and outputs the multiplication result (Iof×Kio) as voltage command correction amount Vz (Vz=Iof×Kio).

A value of gain Kio that can reduce the harmonic component of output current Io of power conversion device 21 and stabilize the operation of voltage control unit 36 is selected. In the present disclosure, the harmonic component means including a high frequency component and a low frequency component. This is applicable to harmonic current described later. In selecting gain Kio, for example, a Bode diagram of each part included in control unit 31 of power conversion device 21 is created, and gain Kio is set such that each part operates stably.

When the sharing ratio of harmonics of output current Io is to be adjusted among a plurality of power conversion devices 21, the frequency characteristics of filter 231 may be set to values different among a plurality of power conversion devices 21. For example, it is assumed that the harmonic component to be reduced by filter 231 is a 180-Hz component. In this case, the gain at 180 Hz in the frequency characteristic of filter 231 is set to 0 dB in power conversion device 21*a* and set to −20 dB in power conversion device 21*b*. With this configuration, when gain Kio is equal between power conversion devices 21*a* and 21*b*, voltage command correction amount Vz of power conversion device 21*a* is a value ten times as large as voltage command correction amount Vz of power conversion device 21*b*.

According to the present embodiment, the harmonics of output current Io can be reduced as voltage command correction amount Vz is greater. That is, the sharing ratio of harmonics of output current Io can be reduced as voltage command correction amount Vz is greater. Therefore, in the case above, the sharing ratio of harmonics of output current Io in power conversion device 21*a* is smaller than the sharing ratio of harmonics of output current Io in power conversion device 21*b*.

When the share of harmonics of output current Io is to be adjusted among a plurality of power conversion devices 21, gain Kio may be set to values different among power conversion devices 21.

Here, the sharing ratio of harmonics of output current Io among a plurality of power conversion devices 21 is to be adjusted in the following cases.

First, the share of harmonics of output current Io is to be adjusted for each power conversion device 21 when load 61 has a frequency characteristic other than fundamental wave, for example, a nonlinear load. Second, the rated capacity may vary for each power conversion device 21. In this case, the sharing ratio of harmonics of power conversion device 21 with a large rated capacity is increased, and the sharing ratio of harmonics of power conversion device 21 with a small rated capacity is reduced. Third, the allowance of thermal design for harmonics may vary for each power conversion device 21. In this case, the sharing ratio of harmonics of power conversion device 21 with a large allowance of thermal design for harmonics is increased, and the sharing ratio of harmonics of power conversion device 21 with a small allowance is reduced. Fourth, power loss for harmonics may vary for each power conversion device 21. In this case, the sharing ratio of harmonics of power conversion device 21 with a small power loss for harmonics is increased, and the sharing ratio of harmonics of power conversion device 21 with a large power loss is reduced. In particular, according to the second to fourth cases, even when the rated capacity, the thermal design, or the power loss varies among a plurality of power conversion devices 21, the burden can be equalized among power conversion devices 21.

(5) Voltage Control Unit 36

Figure 18:
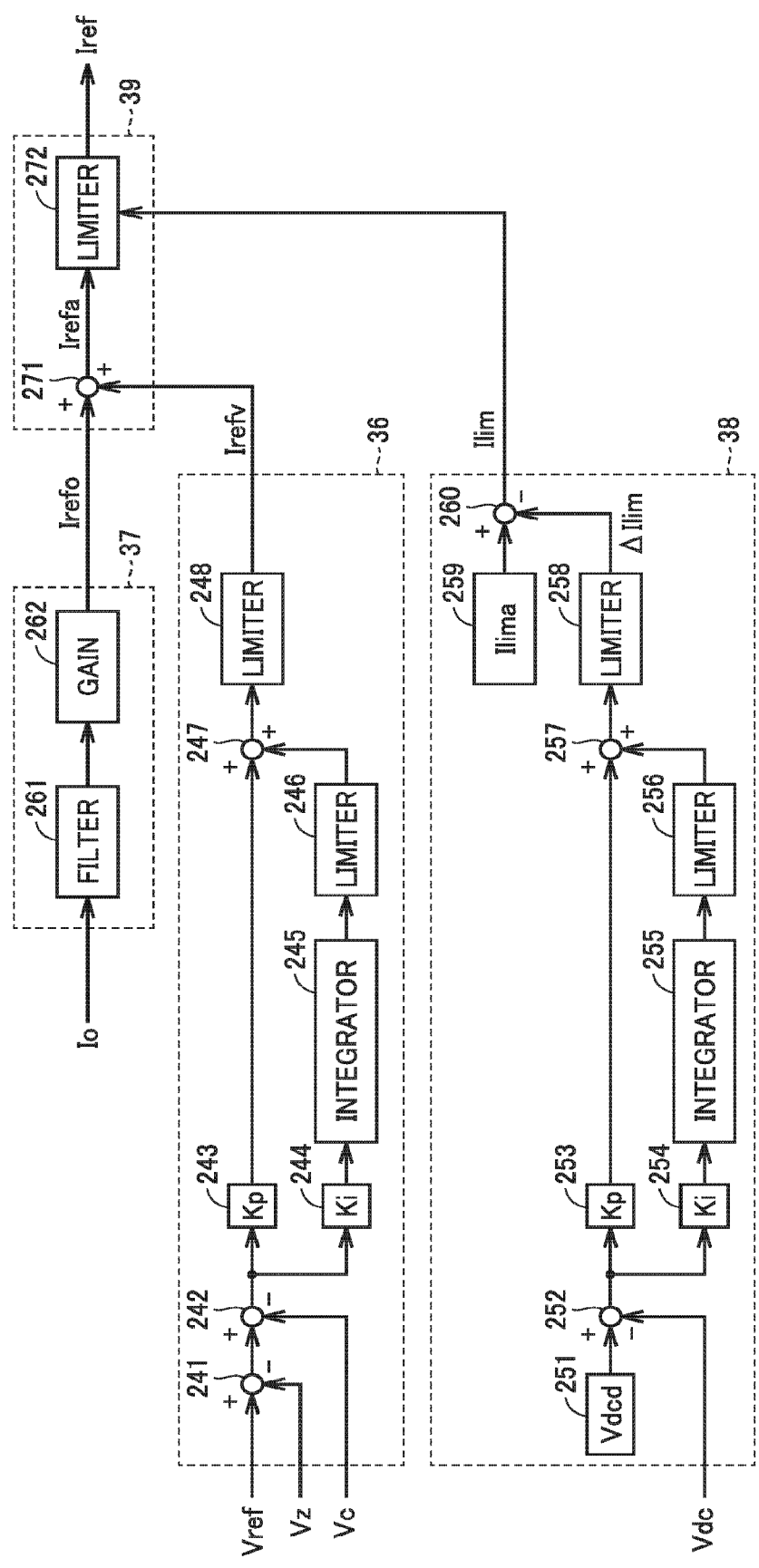
FIG. 18 is a block diagram showing an internal configuration of a voltage control unit shown in FIG. 4.

FIG. 18 is a block diagram showing an internal configuration of voltage control unit 36 shown in FIG. 4. FIG. 18 further shows the internal configuration of each of output current adjustment unit 37, undervoltage suppression unit 38, and current command limiting unit 39.

Voltage control unit 36 is configured to receive voltage command Vref generated by voltage command generation unit 34 (FIG. 14), voltage command correction amount Vz generated by voltage command correction unit 35 (FIG. 16), and the detected value of output voltage Vc detected by voltage sensor 13, and output current command Irefv.

Voltage control unit 36 is to correct output voltage Vc of power conversion device 21. As will be described below, voltage control unit 36 corrects output voltage Vc so as to suppress a deviation of output voltage Vc caused by voltage drop in filter reactor 4 and harmonics of output current Io.

Referring to FIG. 18, voltage control unit 36 includes subtractors 241, 242, a proportional gain (Kp) 243, an integral gain (Ki) 244, an integrator 245, limiters 246, 248, and an adder 247.

Subtractor 241 subtracts voltage command correction amount Vz from voltage command Vref and outputs the subtraction result (Vref−Vz). This subtraction result (Vref−Vz) is a voltage to be output in order to reduce the harmonics of output current Io of power conversion device 21. Specifically, when the harmonic component of output current Io is a positive large value, the harmonic component of voltage command correction amount Vz is a positive large value. The harmonic component of output (Vref−Vz) of subtractor 241 is therefore a negative large value. Accordingly, the harmonic component of output voltage Vc of power conversion device 21 is reduced and consequently, the harmonic component of output current Io is reduced.

Subtractor 242 subtracts the detected value of output voltage Vc detected by voltage sensor 13 from the output (Vref−Vz) of subtractor 241 and outputs the subtraction result (Vref−Vz−Vc). The output of subtractor 242 is the deviation between the voltage to be output by power conversion device 21 and output voltage Vc.

Proportional gain 243, integral gain 244, integrator 245, limiters 246, 248, and adder 247 constitute a PI controller, which receives the deviation between the voltage to be output by power conversion device 21 and output voltage Vc and generates current command Irefv for nulling this deviation.

In voltage control unit 36, proportional gain 243 and integral gain 244 are set to the degree that the operation of voltage control unit 36 is stable and a desired response is obtained. Limiters 246, 248 are set to be larger than a current variation range estimated in power conversion device 21. Values equal to each other may be set for limiters 246, 248.

For example, when power conversion device 21 has an output current range of rating 30 Arms and operates with current variation of −30 Arms to +30 Arms, each of limiters 246, 248 is set to output a value of −30 Arms to +30 Arms. Alternatively, when the ratio (crest factor) between the peak value of waveform of output current Io and the effective value is set to a large value, each of limiters 246, 248 is set to a value equal to or greater than the peak value. For example, with a rating of 30 Arms and a crest factor of 3, each of limiters 246, 248 is set in a range of −90 Arms or less to +90 Arms or more.

In FIG. 18, voltage control unit 36 is configured as a PI controller. However, the configuration of voltage control unit 36 is not limited thereto. For example, voltage control unit 36 may be configured as a proportional controller or may be a series configuration of a proportional controller and a phase compensator.

Proportional gain 243 outputs the result of multiplying the output of subtractor 242 (that is, the deviation between the voltage to be output by power conversion device 21 and output voltage Vc) by proportional gain Kp (output of subtractor 242×Kp).

Integral gain 244 outputs the result of multiplying the output of subtractor 242 by integral gain Ki (output of subtractor 242×Ki).

Integrator 245 integrates the value obtained by multiplying the output of integral gain 244 in one calculation step time, for each calculation step, and outputs the integration result. Although not shown, the integrated value of integrator 245 is limited to be equal to or greater than the upper limit value and equal to or smaller than the lower limit value of limiter 246 connected at the stage subsequent to integrator 245.

Limiter 246 has an upper limit value and a lower limit value and receives the output of integrator 245. Limiter 246 outputs the upper limit value when the input value (output of integrator 245) is greater than the upper limit value, and outputs the lower limit value when the input value (output of integrator 245) is smaller than the lower limit value. When the input value (output of integrator 245) is equal to or greater than the lower limit value and equal to or smaller than the lower limit value, the limiter 246 outputs the input value.

Adder 247 adds the output of proportional gain 244 (output of subtractor 242×Kp) to the output of limiter 246 and outputs the addition result.

Limiter 248 has an upper limit value and a lower limit value and receives the output of adder 247. Limiter 248 outputs the upper limit value when the input value (output of adder 247) is greater than the upper limit value, and outputs the lower limit value when the input value (output of adder 247) is smaller than the lower limit value. When the input value (output of adder 247) is equal to or greater than the lower limit value and equal to or smaller than the lower limit value, limiter 248 outputs the input value.

(6) Output Current Adjustment Unit 37 Referring to FIG. 18, output current adjustment unit 37 includes a filter 261 and a gain 262. Output current adjustment unit 37 is configured to receive the detected value of output current Io detected by current sensor 14 and output current command Irefo.

Specifically, output current adjustment unit 37 performs filter processing for output current Io using filter 261 and outputs a value obtained by multiplying the filtered output current Io by gain 262 as current command Irefo.

Filter 261 may be a low-pass filter, a high-pass filter, a phase compensator, or a combination thereof. Gain 262 is set such that the operation of voltage control unit 36 and current control unit 40 is stable.

Current command Irefo is generated by output current adjustment unit 37, whereby change in current command Irefv output by voltage control unit 36 can be reduced for fluctuation in output current Io, for example, due to change of load 61. This can reduce the effect of load 61 on the control response of voltage control unit 36.

(7) Undervoltage Suppression Unit 38

Undervoltage suppression unit 38 receives the detected value of DC bus voltage Vdc detected by voltage sensor 11 and outputs current limit command Ilim. Undervoltage suppression unit 38 is configured to suppress reduction of DC bus voltage Vdc due to discharging of DC bus capacitor 2 when output change of DC power supply 60 delays for a sudden change of load 61.

Specifically, when DC bus voltage Vdc is normal (that is, DC bus voltage Vdc is larger than lower limit value Vdcd of DC bus voltage), undervoltage suppression unit 38 sets current limit command Ilim for limiting the current command of reactor current IL of power conversion device 21 to initial limit current value Ilima of initial limit current 259.

The current command of reactor current IL corresponds to the sum of current command Irefv generated by voltage control unit 36 and current command Irefo generated by output current adjustment unit 37. In the following description, the addition value of current command Irefv and current command Irefo may be referred to as "added current command Irefa" (Irefa=Irefv+Irefo).

On the other hand, when DC bus voltage Vdc becomes lower than lower limit voltage Vdcd, undervoltage suppression unit 38 sets current limit command Ilim to a value lower than initial limit current value Ilima by correction current value ΔIlim (ΔIlim is a positive value) (Ilim=Ilima−ΔIlim).

Referring to FIG. 18, undervoltage suppression unit 38 includes a lower limit voltage (Vdcd) 251, subtractors 252, 260, a proportional gain (Kp) 253, an integral gain (Ki) 254, an integrator 255, limiters 256, 258, an adder 257, and an initial limit current (Ilima) 259.

Lower limit voltage 251 outputs lower limit value Vdcd of DC bus voltage Vdc. Lower limit value Vdcd is a voltage of DC bus capacitor 2 necessary for power conversion device 21 to output normal voltage. For example, when output voltage Vc of power conversion device 21 is 200 Vrms, lower limit value Vdcd can be set to about 330 V with a likelihood for the amplitude of output voltage Vc (about 280 V). Lower limit value Vdcd may be adjusted in accordance with the characteristics of DC power supply 60.

As shown in FIG. 1, in the configuration in which a plurality of power conversion devices 21 are connected to common DC power supply 60, lower limit value Vdcd is set to a common value in power conversion devices 21. On the other hand, as shown in FIG. 2, in a configuration in which a plurality of power conversion devices 21 are connected to power supplies 60 different from each other, lower limit value Vdcd may be set to a value different for each power conversion device 21.

Subtractor 252 subtracts the detected value of DC bus voltage Vdc from lower limit value Vdcd output from lower limit voltage 251 and outputs the subtraction result (Vdcd−Vdc). The output of subtractor 252 is the deviation between lower limit value Vdcd and DC bus voltage Vdc.

Proportional gain 253, integral gain 254, integrator 255, limiters 256, 258, and adder 257 constitute a PI controller, which receives the deviation between lower limit value Vdcd and DC bus voltage Vdc and generates correction current value ΔIlim for nulling this deviation.

Proportional gain 253 and integral gain 254 are set to such a degree that the operation of undervoltage suppression unit 38 is stable and a desired response is obtained. Limiters 256, 258 need to set the lower limit value of limiters 256, 258 to zero so as not to limit current limit command Ilim when DC bus voltage Vdc is normal (when Vdc>Vdcd).

For example, when DC bus voltage Vdc is 350 V and lower limit value Vdcd is 330 V, the deviation between lower limit value Vdcd and DC bus voltage Vdc is 330 V 350 V=−20 V. When this deviation (−20 V) is input to the P1 controller, correction current value ΔIlim is a negative value. For the sake of simplicity, it is assumed that the integrated value of integrator 255 is zero.

When correction current value ΔIlim is a negative value, current limit command Ilim is a value obtained by adding correction current value ΔIlim to initial limit current value Ilima and is substantially larger than initial limit current value Ilima. Thus, current limit command Ilim acts in the direction in which reactor current IL of power conversion device 21 is overcurrent, so that power conversion device 21 may stop due to overcurrent.

When load 61 suddenly changes in a state in which correction current value ΔIlim is negative (it is assumed that the integrated value of integrator 255 is also negative) and DC bus voltage Vdc becomes lower than lower limit value Vdcd, there is a delay until the integrated value of integrator 255 changes from negative to positive, and consequently DC bus voltage Vdc may become excessively low.

Then, each of limiters 256, 258 sets the lower limit value to zero to prevent correction current value Δilim from becoming a negative value. This can suppress reactor current IL from becoming overcurrent and shorten the delay until correction current value ΔIlim changes to positive when DC bus voltage Vdc becomes lower than lower limit value Vdcd.

The upper limit value of each of limiters 256, 258 is set to initial limit current value Ilima.

In FIG. 18, undervoltage suppression unit 38 is configured as a PI controller. However, the configuration of undervoltage suppression unit 38 is not limited thereto. For example, undervoltage suppression unit 38 may be configured as a proportional controller or may be a series configuration of a proportional controller and a phase compensator.

Proportional gain 253 outputs the result of multiplying the output of subtractor 252 (that is, the deviation between lower limit value Vdcd and output voltage Vc) by proportional gain Kp (output of subtractor 252×Kp).

Integral gain 254 outputs the result of multiplying the output of subtractor 252 by integral gain Ki (output of subtractor 252×Ki).

Integrator 255 integrates the value obtained by multiplying the output of integral gain 254 by one calculation step time, for each calculation step, and outputs the integration result. Although not shown, the integrated value of integrator 255 is limited to be equal to or greater than the upper limit value and equal to or smaller than the lower limit value of limiter 256 connected at the stage subsequent to integrator 255.

Limiter 256 has an upper limit value and a lower limit value and receives the output of integrator 255. Limiter 256 outputs the upper limit value when the input value (output of integrator 255) is greater than the upper limit value, and outputs the lower limit value when the input value (output of integrator 255) is smaller than the lower limit value. When the input value (output of integrator 255) is equal to or greater than the lower limit value and equal to or smaller than the lower limit value, the limiter 256 outputs the input value.

Adder 257 adds the output of proportional gain 254 (output of subtractor 252 Kp) to the output of limiter 256 and outputs the addition result.

Limiter 258 has an upper limit value and a lower limit value and receives the output of adder 257. Limiter 258 outputs the upper limit value when the input value (output of adder 257) is greater than the upper limit value, and outputs the lower limit value when the input value (output of adder 257) is smaller than the lower limit value. When the input value (output of adder 257) is equal to or greater than the lower limit value and equal to or smaller than the lower limit value, limiter 258 outputs the input value.

Initial limit current (Ilima) 259 serves as current limit command Ilim for limiting reactor current IL when DC bus voltage Vdc is normal. Initial limit current Ilima is set to the design maximum current of reactor current IL of power conversion device 21. For example, initial limit current Ilima can be set to maximum allowable current of hardware of power conversion device 21 or a peak current value derived from the crest factor.

Subtractor 260 subtracts correction current value ΔIlim from initial limit current Ilima and outputs the subtraction result (Ilima−ΔIlim). The output of subtractor 260 is current limit command Ilim of reactor current Il.

(8) Current Command Limiting Unit 39

Referring to FIG. 18, current command limiting unit 39 receives current command Irefv generated by voltage control unit 36, current command Irefo generated by output current adjustment unit 37, and current limit command Ilim generated by undervoltage suppression unit 38 and outputs current command Iref. Current command limiting unit 39 is configured to limit the current command (added current command Irefa) of reactor current IL of power conversion device 21 within current limit command Ilim.

Specifically, current command limiting unit 39 includes an adder 271 and a limiter 272. Adder 271 adds current command Irefv from voltage control unit 36 to current command Irefo from output current adjustment unit 37 and outputs the addition result (Irefv+Irefo) as added current command Irefa.

Limiter 272 receives added current command Irefa and current limit command Ilim and outputs current command Iref. Specifically, limiter 272 has an upper limit value (current limit command Ilim) and a lower limit value (−current limit command Ilim), outputs the upper limit value when added current command Irefa is greater than upper limit value (current limit command Ilim), and outputs the lower limit value when added current command Irefa is smaller than the lower limit value (−current limit command Ilim). When added current command Irefa is equal to or greater than the lower limit value and equal to or smaller than the lower limit value, limiter 272 outputs the input value.

(9) Current Control Unit 40

Figure 19:
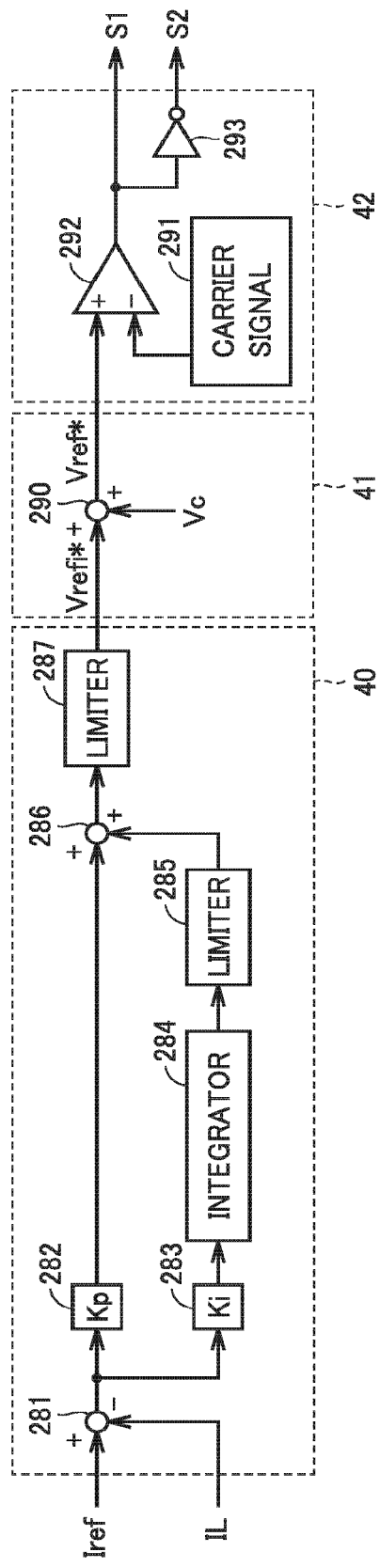
FIG. 19 is a block diagram showing an internal configuration of a current control unit shown in FIG. 4.

FIG. 19 is a block diagram showing an internal configuration of current control unit 40 shown in FIG. 4. FIG. 19 further shows the internal configuration of an INV voltage command generation unit 41 and a PWM signal generation unit 42.

Referring to FIG. 19, current control unit 40 receives current command Iref generated by current command limiting unit 39 (FIG. 18) and the detected value of reactor current TL detected by current sensor 12 and outputs voltage command Vrefi*. Current control unit 40 is to correct reactor current IL of power conversion device 21, specifically, configured to correct a deviation of reactor current IL caused by change in DC bus voltage Vdc and output voltage Vc.

Current control unit 40 includes a subtractor 281, a proportional gain (Kp) 282, an integral gain (Ki) 283, an integrator 284, limiters 285, 287, and an adder 286.

Subtractor 281 subtracts the detected value of reactor current IL from current command Iref and outputs the subtraction result (Iref−IL). The output of subtractor 281 is the deviation between current command Iref and reactor current IL.

Proportional gain (Kp) 282, integral gain (Ki) 283, integrator 284, limiters 285, 287, and adder 286 constitute a PI controller, which generates voltage command Vrefi* for nulling the deviation between current command value Iref and reactor current IL.

In current control unit 40, proportional gain 282 and integral gain 283 are set to such a degree that the operation of current control unit 40 is stable and a desired response is obtained. Limiters 285, 287 may be set to a voltage that can sufficiently adjust reactor current IL. Values equal to each other may be set for limiters 285, 287.

For example, when power conversion device 21 operates with output voltage 200 Vrms (peak voltage 283 V), each of limiters 285, 287 is set to output a value of −283 V to +283 V.

In FIG. 19, current control unit 40 is configured as a PI controller. However, the configuration of current control unit 40 is not limited thereto. For example, current control unit 40 may be configured as a proportional controller or may be a series configuration of a proportional controller and a phase compensator.

Proportional gain 282 outputs the result of multiplying the output of subtractor 281 (that is, the deviation between current command Iref and reactor current IL) by proportional gain Kp (output of subtractor 282×Kp).

Integral gain 283 outputs the result of multiplying the output of subtractor 281 by integral gain Ki (output of subtractor 281×Ki).

Integrator 284 integrates the value obtained by multiplying the output of integral gain 283 in one calculation step time, for each calculation step, and outputs the integration result. Although not shown, the integrated value of integrator 284 is limited to be equal to or greater than the upper limit value and equal to or smaller than the lower limit value of limiter 285 connected at the stage subsequent to integrator 284.

Limiter 285 has an upper limit value and a lower limit value and receives the output of integrator 284. Limiter 285 outputs the upper limit value when the input value (output of integrator 284) is greater than the upper limit value, and outputs the lower limit value when the input value (output of integrator 284) is smaller than the lower limit value. When the input value (output of integrator 284) is equal to or greater than the lower limit value and equal to or smaller than the lower limit value, the limiter 285 outputs the input value.

Adder 286 adds the output of proportional gain 282 (output of subtractor 281×Kp) to the output of limiter 285 and outputs the addition result.

Limiter 287 has an upper limit value and a lower limit value and receives the output of adder 286. Limiter 287 outputs the upper limit value when the input value (output of adder 286) is greater than the upper limit value, and outputs the lower limit value when the input value (output of adder 286) is smaller than the lower limit value. When the input value (output of adder 286) is equal to or greater than the lower limit value and equal to or smaller than the lower limit value, limiter 287 outputs the input value.

(10) INV Voltage Command Generation Unit 41

Referring to FIG. 19, INV voltage command generation unit 41 receives voltage command Vrefi* generated by current control unit 40 and the detected value of output voltage Vc detected by voltage sensor 13 and outputs voltage command Vref*. Specifically, INV voltage command generation unit 41 includes an adder 290. Adder 290 adds voltage command Vrefi* to output voltage Vc and outputs the addition result (Vrefi*+Vc) as voltage command Vref* (Vref*=Vrefi*+Vc).

(11) PWM Signal Generation Unit 42

Referring to FIG. 19, PWM signal generation unit 42 is configured to generate PWM signals S1, S2, based on voltage command Vref* generated by INV voltage command generation unit 41 and carrier signal Scarr.

Specifically, PWM signal generation unit 42 includes a carrier signal generator 291 for generating carrier signal Scarr, a comparator 292, and an inverter 293. For the sake of simplicity, in the following description, a short-circuit preventing time (dead time) of a switching leg is not taken into consideration.

Figure 20:
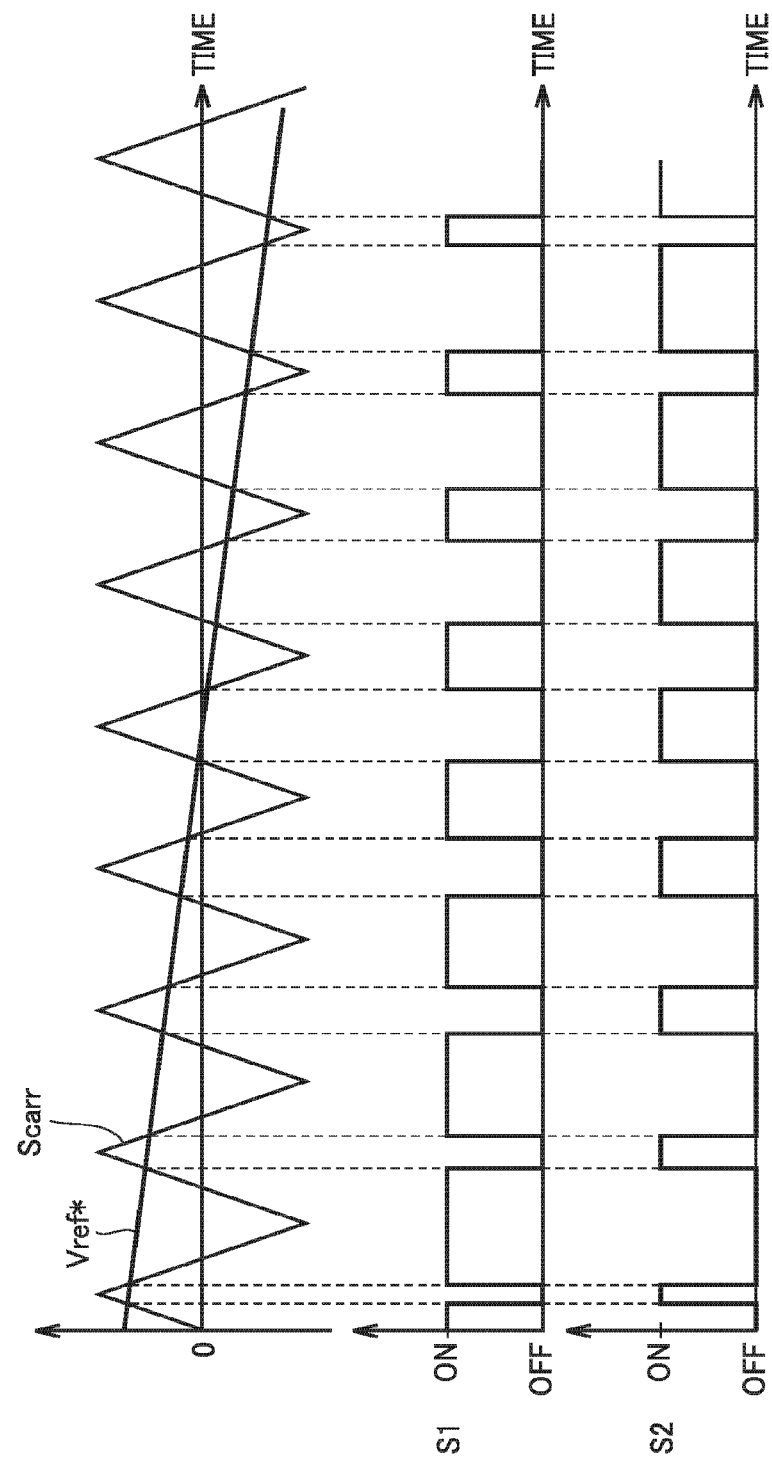
FIG. 20 is a time chart for explaining the operation of a PWM signal generation unit shown in FIG. 19.

FIG. 20 is a time chart for explaining the operation of PWM signal generation unit 42. In FIG. 20, Scarr shows a carrier signal output from carrier signal generator 291, and S1, S2 show PWM signals output from PWM signal generation unit 42 to switching element unit 3.

Figure 21:
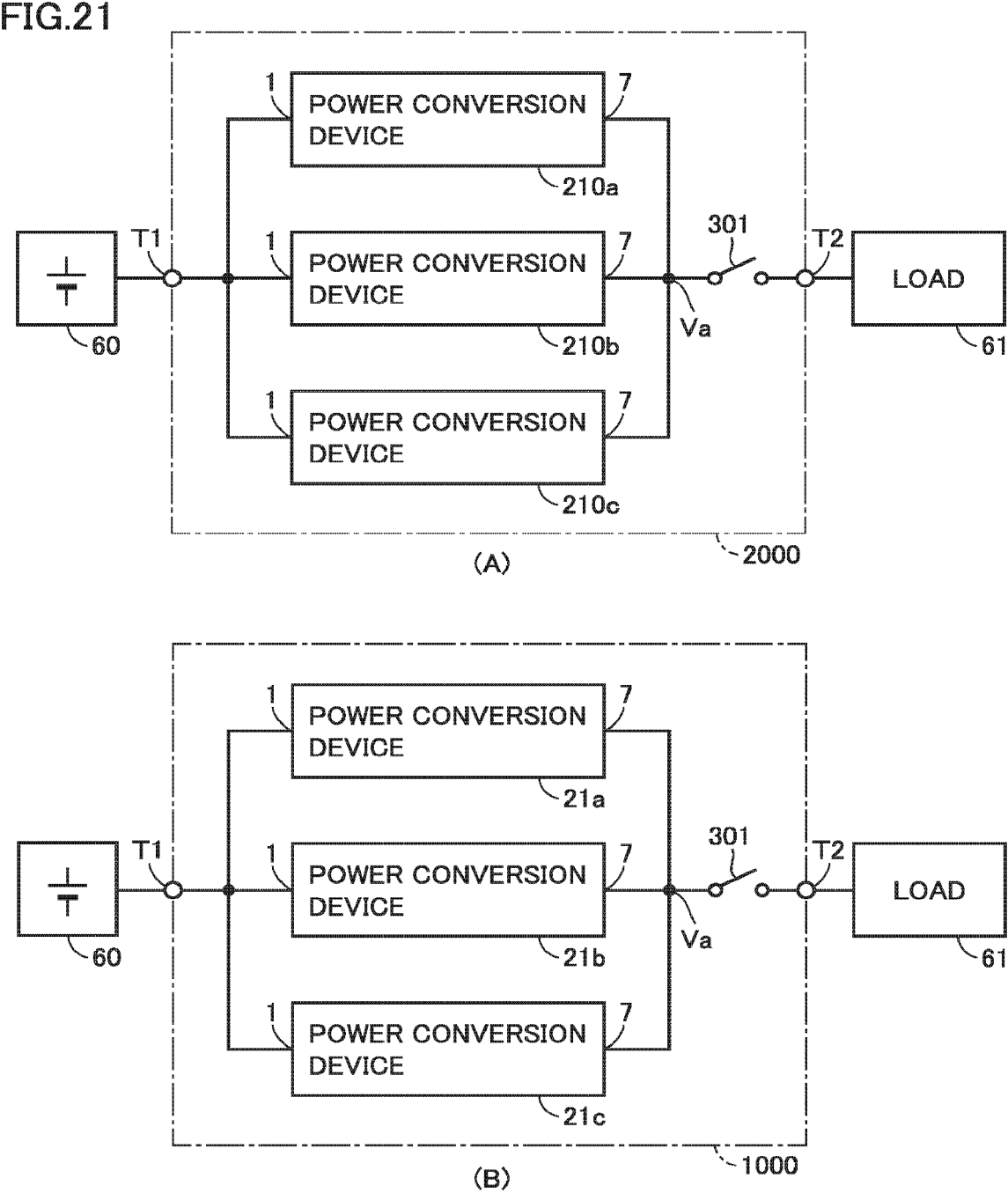
FIG. 21 is a diagram schematically showing the configurations of the power conversion systems according to Example and Comparative Example.

Referring now to FIG. 20 and FIG. 21, the process of generating a PWM signal will be described.

Carrier signal generator 291 generates a triangular wave in accordance with a carrier frequency. Although carrier signal Scarr is a triangular wave in FIG. 20, it may be a serrated wave.

Comparator 292 compares the magnitudes of voltage command Vref* and carrier signal Scarr. Comparator 292 outputs an ON signal when voltage command Vref* is greater than carrier signal Scarr, and outputs an OFF signal when voltage command Vref* is smaller than carrier signal Scarr.

The output signal of comparator 292 serves as one control signal (PWM signal S1) in switching element unit 3. Inverter 293 inverts the ON signal and the OFF signal of the input control signal (PWM signal S1) and outputs the inverted signal. The output signal of inverter 293 serves as the other control signal (PWM signal S2) in switching element unit 3.

FIG. 20 illustrates a configuration in which carrier signal Scarr and voltage command Vref* are compared to generate PWM signal S1, S2. However, voltage command Vref* may be standardized using DC bus voltage Vdc.

(Verification Experiment)

Finally, a verification experiment conducted for verifying the effect of the present invention is described.

In the verification experiment, a power conversion system 2000 shown in FIG. 21(A) was used as Comparative Example, and a power conversion system 1000 shown in FIG. 21(B) was used as Example.

Referring to FIG. 21(B), power conversion system 1000 according to Example includes three power conversion devices 21a, 21b, 21c. A switch 301 is connected between an interconnection point of output terminals 7 of power conversion devices 21 and output terminal T2. Switch 301 is turned on whereby load 61 is applied to power conversion system 1000.

Referring to FIG. 21(A), power conversion system 2000 according to Comparative Example includes three power conversion devices 210a, 210b, 210c. Three power conversion devices 210a, 210b, 210c basically have the same configuration. Hereinafter three power conversion devices 210a, 210b, 210c are simply called power conversion device 210 when collectively referred to.

Power conversion system 2000 according to Comparative Example includes three power conversion devices operating in parallel to output the combined power of power conversion devices 210 to supply load 61, in the same manner as power conversion system 1000 shown in FIG. 21(B). However, as described later with reference to FIG. 22, power conversion system 2000 according to Comparative Example differs from power conversion system 1000 according to the present embodiment in the configuration of power conversion device 210.

Figure 22:
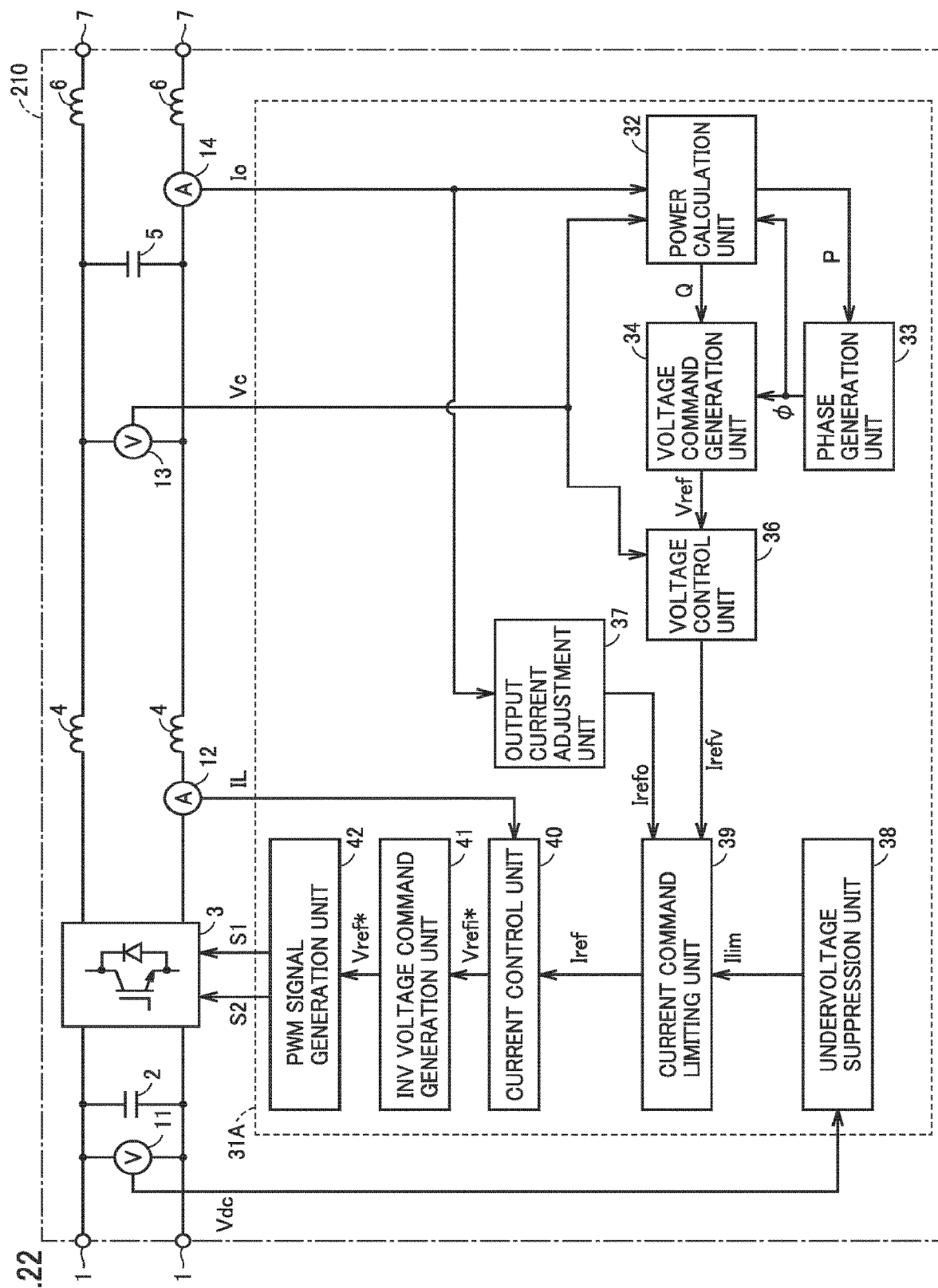
FIG. 22 is a diagram schematically showing a configuration of a power conversion device according to Comparative Example.

FIG. 22 is a diagram schematically showing a configuration of power conversion device 210 according to Comparative Example. Referring to FIG. 22, in power conversion device 210 according to Comparative Example, control unit 31 in power conversion device 21 according to the present embodiment shown in FIG. 4 is replaced by a control unit 31A. Control unit 31A basically has a similar configuration as control unit 31 shown in FIG. 4 but differs in that it does not have voltage command correction unit 35.

Therefore, in power conversion device 210 according to Comparative Example, voltage command Vref generated by voltage command generation unit 34 is used without being corrected in voltage control unit 36, and current command Iref is generated based on the deviation between voltage command Vref and output voltage Vc. The other configuration is the same as that of power conversion device 21 according to Example.

In the verification experiment, in power conversion device 21 according to Example, filter 231 included in voltage command correction unit 35 (FIG. 16) is set to the frequency characteristic shown in FIG. 17(A). In each of Comparative Example and Example, the following variations in inductance component of filter reactor 4 among three power conversion devices are set.

Power Conversion Device 21a, 210a: 1.0 [p.u.]
Power Conversion Device 21b, 210b: 0.5 [p.u.]
Power Conversion Device 21c, 210c: 1.2 [p.u.]

Further, in order to produce an error in output voltage Vc among three power conversion devices, a dead time (the time at which PWM signals S1, S2 simultaneously turn OFF) is set in PWM signals S1, S2.

Figure 23:
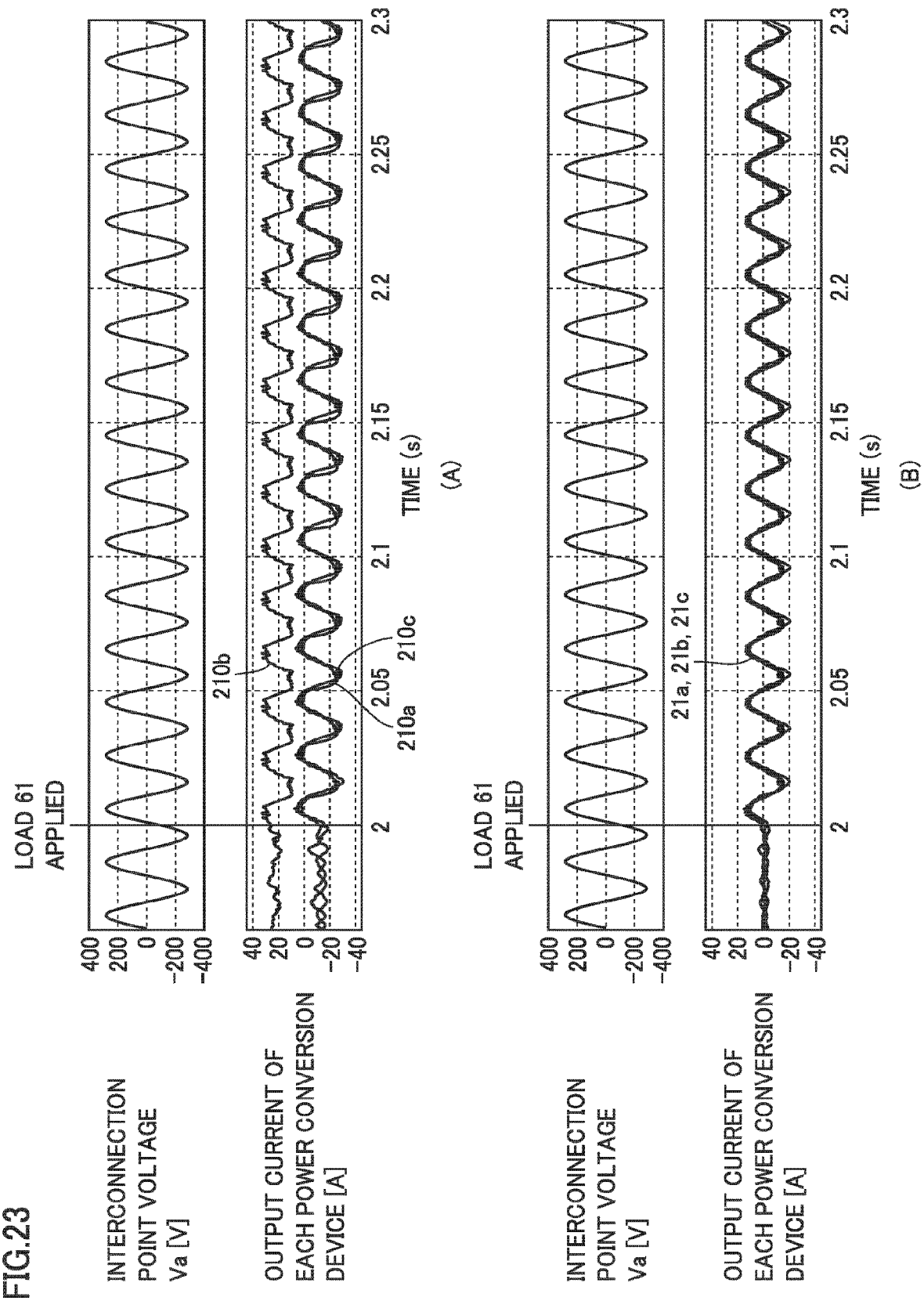
FIG. 23 is a timing chart for explaining the operation of each power conversion device in the power conversion system according to Comparative Example and the power conversion system according to Example.

FIG. 23 shows the result of the verification experiment. FIG. 23(A) is a timing chart for explaining the operation of each power conversion device 210 in power conversion system 2000 according to Comparative Example (FIG. 21(A)). FIG. 23(A) shows the waveforms of voltage Va at the interconnection point (hereinafter also referred to as "interconnection point voltage") and output current of each of power conversion devices 210a, 210b, 210c (current flowing through output reactor 6).

FIG. 23(B) is a timing chart for explaining the operation of each power conversion device in power conversion system 1000 according to Example (FIG. 21(B)). FIG. 23(B) shows the waveforms of interconnection point voltage Va and output current of each of power conversion devices 21a, 21b, 21c (current flowing through output reactor 6). The load current is usually the sum of output currents of three power conversion devices.

Both timing charts in FIGS. 23(A) and 23(B) show the waveforms of voltage and current in a single-phase configuration. However, the present invention is not limited to a single-phase configuration and may be applied to a three-phase configuration.

First, referring to FIG. 23(A), in power conversion system 2000 according to Comparative Example, comparison of output currents of power conversion devices 210a, 210b, 210c indicates that output current varies before application of load 61 and current concentrates especially on power conversion device 210b.

This variation is mainly attributable to that the reactor component of filter reactor 4 of power conversion device 210b is smaller than the reactor component of filter reactors 4 of other power conversion devices 210a, 210c. That is, since the impedance of filter reactor 4 of power conversion device 210b is smaller than that of power conversion devices 210a, 210c, the sharing ratio of current of power conversion device 210b is larger.

Even after application of load 61, output current varies among power conversion devices 210a, 210b, 210c for the reason above. Therefore, in power conversion system 2000 according to Comparative Example, it is difficult to make uniform the sharing ratio of current among a plurality of power conversion devices 210 operating in parallel.

By contrast, referring to FIG. 23(B), in power conversion system 1000 according to Example, comparison of output currents among power conversion devices 21a, 21b, 21c indicates that deviation of output current is improved before and after application of load 61. This is because an error in inductance component of filter reactor 4 and an error in output voltage Vc due to the dead time as described above are corrected by voltage command correction unit 35 in each power conversion device 21.

Specifically, when the harmonic component (including a high frequency component and a low frequency component) of output current Io increases, voltage command correction unit 35 in each power conversion device 21 outputs voltage command correction amount Vz such that this harmonic component is reduced. This voltage command correction amount Vz acts so as to reduce the error in inductance component of filter reactor 4 and an error in output voltage Vc due to dead time.

Figure 24:
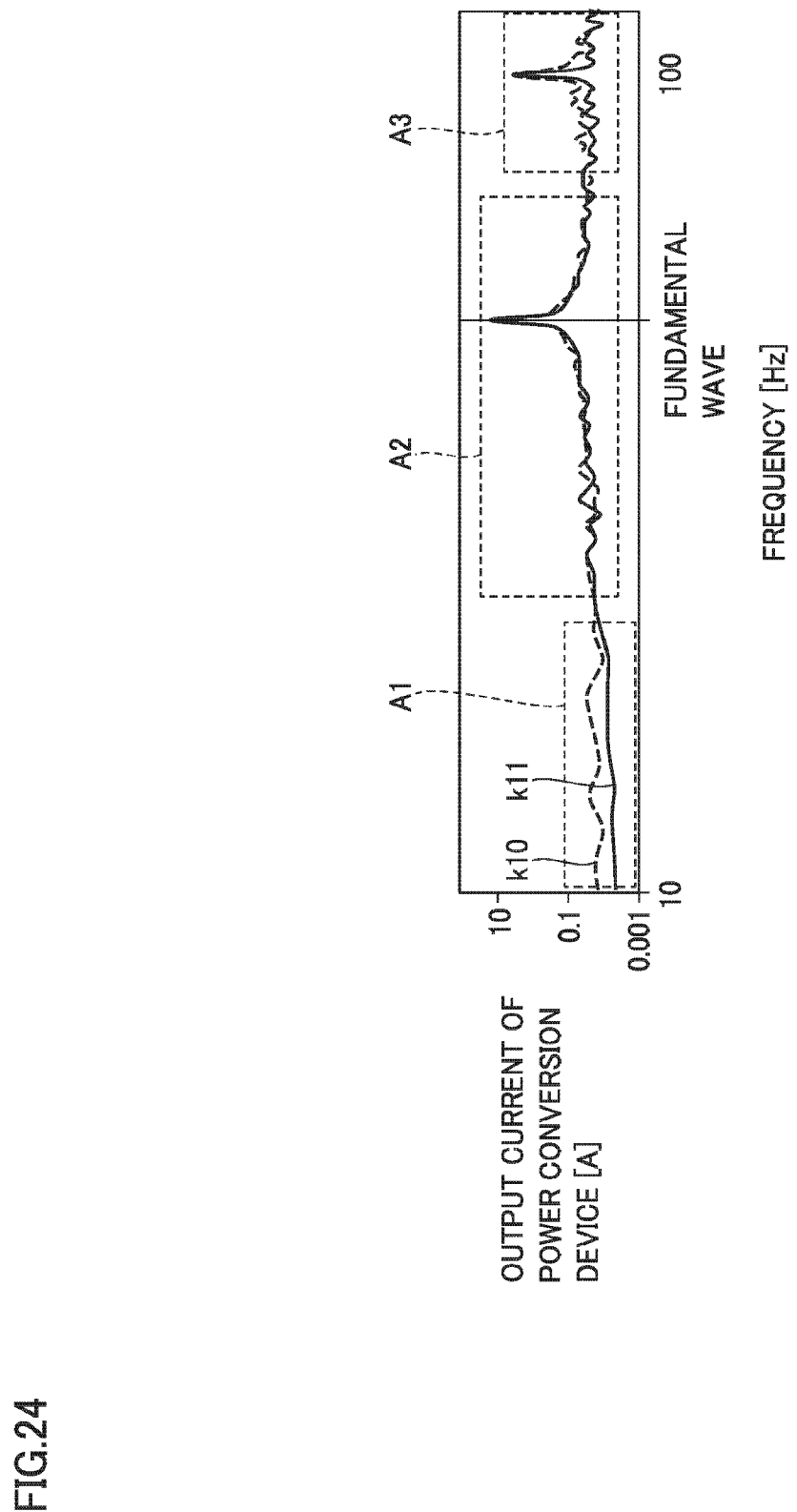
FIG. 24 is a diagram showing the result of FFT analysis of output current of each power conversion device shown in FIG. 23.

FIG. 24 shows the result of FFT (fast Fourier transform) analysis of output current of each conversion device shown in FIGS. 23(A) and 23(B). The frequency characteristic shown in FIG. 24 shows the current value that is largest in respective frequency components among three power conversion devices operating in parallel in each power conversion system. Waveform k11 indicated by a solid line in the figure shows the frequency characteristic of output current in power conversion system 1000 according to Example. Waveform k10 shown by a broken line in the figure shows the frequency characteristic of output current in power conversion system 2000 according to Comparative Example.

FIG. 24 suggests that in Example, compared with Comparative Example, output current is reduced in each of low frequency (corresponding to region A1 in the FIG.) and high frequency (corresponding to region A3 in the figure).

By contrast, in the vicinity of fundamental wave (corresponding to region A2 in the figure), there is almost no difference in magnitude of output current between Comparative Example and Example. This is because filter 231 of voltage command correction unit 35 is set to the frequency characteristic shown in FIG. 17(A) and therefore voltage command correction amount Vz is generated such that the high frequency component and the low frequency component in output current are reduced.

In this way, the power conversion system according to the present invention can suppress the harmonic component of the output current while reducing the effect of the output current on the fundamental component.

Figure 25:
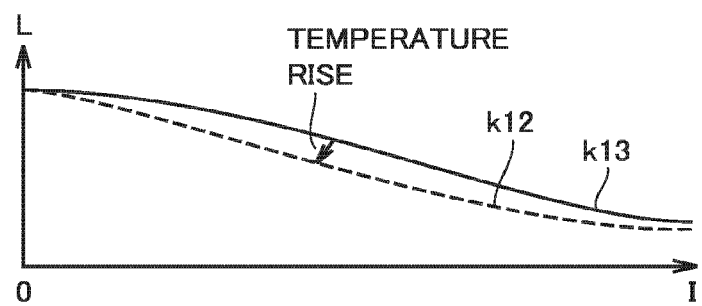
FIG. 25 is a diagram showing the relation between current flowing through the filter reactor and inductance of the filter reactor.

The inductance of filter reactor 4 also varies with the temperature of filter reactor 4. FIG. 25 schematically shows the relation between current flowing through filter reactor 4 and the inductance of filter reactor 4. In FIG. 25, the vertical axis shows inductance L of filter reactor 4, and the horizontal axis shows current I flowing through filter reactor 4.

As current I flowing through filter reactor 4 increases, the heat generated in filter reactor 4 increases and thus the temperature of filter reactor 4 rises. Waveform k13 indicated by a solid line in the figure shows the relation between current I and inductance L when the temperature of filter reactor 4 is a first temperature. Waveform k12 indicated by a broken line in the figure shows the relation between current I and inductance L when the temperature of filter reactor 4 is a second temperature higher than the first temperature. As shown in FIG. 25, filter reactor 4 has the property of having inductance L decreasing as the temperature rises. When the temperature of filter reactor 4 approaches Curie temperature, the inductance rapidly decreases.

When the inductance of filter reactor 4 decreases, the impedance of power conversion device 21 decreases. Therefore, when a plurality of power conversion devices 21 operate in parallel, a difference in temperature of filter reactor 4 among power conversion devices 21 causes a difference in impedance among power conversion devices 21.

Further, when current flowing through filter reactor 4 increases, the inductance decreases due to magnetic saturation and therefore the impedance of power conversion device 21 decreases. As a result, of a plurality of power conversion devices 21 operating in parallel, current concentrates on power conversion device 21 with the impedance decreasing and consequently, overcurrent easily occurs.

In power conversion system 1000 according to the present first embodiment, even when the impedance varies among a plurality of power conversion devices 21 operating in parallel, each power conversion device 21 can operate such that current flows in a state in which reduction of impedance is suppressed. Therefore, the power share can be made uniform among a plurality of power conversion devices 21.

In power conversion system 1000 according to the present first embodiment, it is not necessary to detect current (load current) supplied to load 61 from power conversion system 1000 for the output current control in each power conversion device 21. Thus, load 61 can be powered stably with appropriate current.

More specifically, the conventional power conversion system described in PTL 1 employs a method of controlling output current of power conversion devices, in which current supplied from the power conversion system to a load (load current) is detected by a current sensor, and a value obtained by dividing the detected load current by the number of power conversion devices operating in parallel is used as an output current command per power conversion device.

However, in such a method, when one of a plurality of power conversion devices stops, a delay in detection of load current or a delay in generating an output current command may occur to increase the deviation between the output current command and the load current. As a result, the total value of output powers (output currents) of the remaining power conversion devices may be lower than power (current) required for the load. If the power balance between the power conversion system and the load is lost, voltage abnormality may occur in some of the power conversion devices and consequently, all the power conversion devices have to be stopped.

By contrast, power conversion system 1000 according to the present first embodiment does not require detection of load current and therefore can avoid the inconvenience described above which occurs when one power conversion device stops.

In a power conversion system including a plurality of power conversion devices operating in parallel to supply power to a load, the maximum value of load current is the total capacity of a plurality of power conversion devices 21. Therefore, the current sensor for detecting load current need to be selected and adjusted considering the number of devices operating in parallel. Power conversion system 1000 according to the present embodiment does not require a current sensor for detecting load current and therefore can avoid such inconvenience.

Furthermore, in power conversion system 1000 according to the present first embodiment, even when the number of devices operating in parallel is changed, power can be stably supplied to load 61 while suppressing cross current of a fundamental component and a harmonic component. This is because in control of output current of each power conversion device 21, detection of load current is not necessary, and in addition, the number of devices operating in parallel is not used as a parameter. More specifically, in the conventional power conversion system, as is the case with the detected value of load current, when some of power conversion devices stop and the number of devices operating in parallel decreases, the power balance between the power conversion system and the load may be lost. By contrast, in power conversion system 1000 according to the present first embodiment, even when the number of devices operating in parallel decreases and the number of devices operating in parallel changes, appropriate current can be stably supplied to the load.

As another method of operating a plurality of power conversion devices in parallel, a higher-level control device capable of fast arithmetic processing may detect load current and control a plurality of power conversion devices based on the detected value of load current. Alternatively, one of a plurality of power conversion devices may serve as a master, the others may serve as slaves, and the master may control the slaves. By contrast, power conversion system 1000 according to the present first embodiment does not require a higher-level control device or a master power conversion device.

Second Embodiment

In power conversion system 1000 according to the foregoing first embodiment, each of a plurality of power conversion devices 21 connected in parallel has a single-phase inverter. However, the present invention can be applied to a configuration in which each of a plurality of power conversion devices has a three-phase inverter.

In a second embodiment, a configuration of power conversion system 1000 including a plurality of power conversion devices each having a three-phase inverter is described.

(Configuration of Power Conversion Device)

Figure 26:
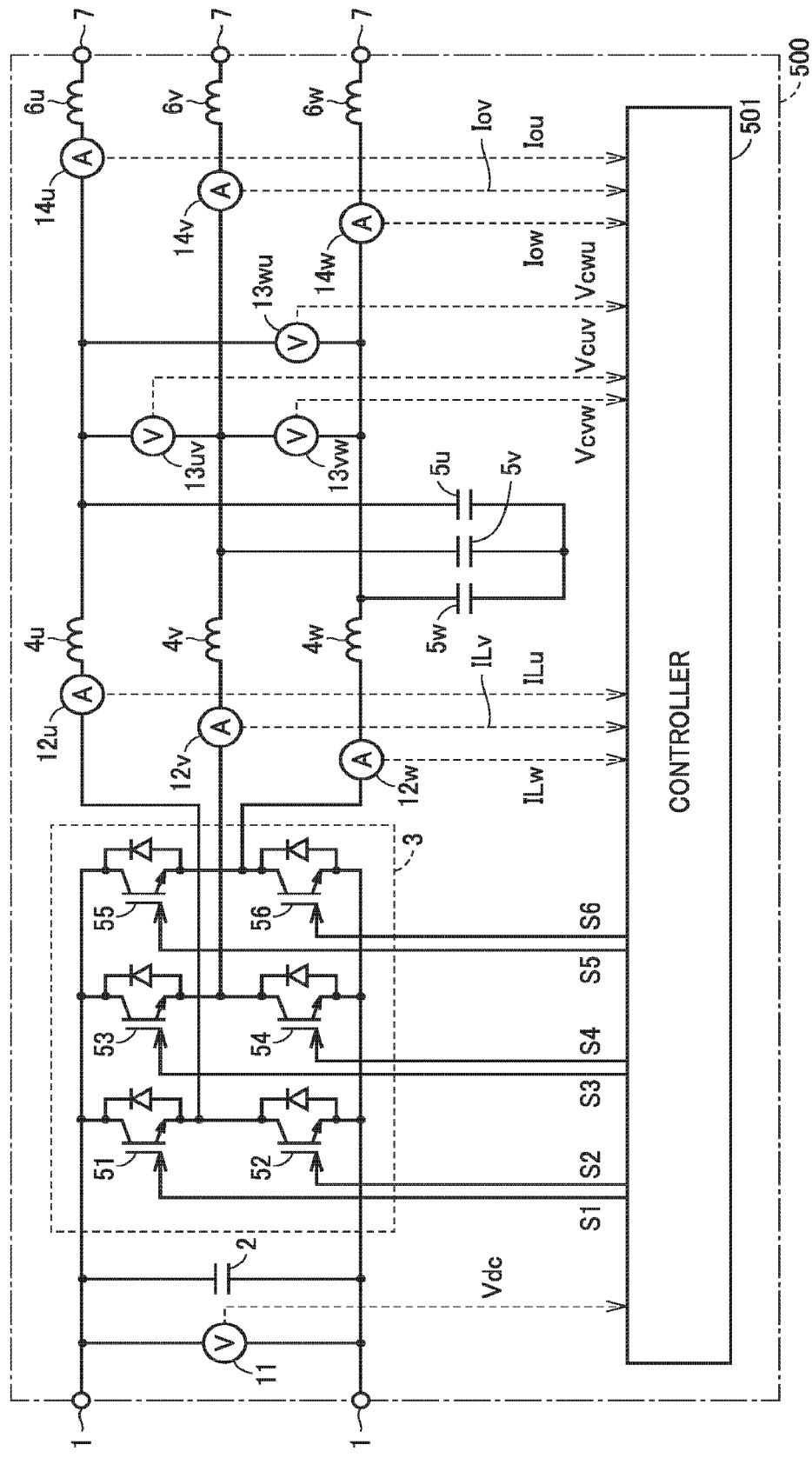
FIG. 26 is a diagram schematically showing a configuration of a power conversion device applied to the power conversion system according to a second embodiment of the present invention.

FIG. 26 is a diagram schematically showing a configuration of a power conversion device 500 applied to power conversion system 1000 according to the second embodiment of the present invention. Power conversion device 500 is configured to convert DC power supplied from a not-shown DC power supply into three-phase AC power.

Referring to FIG. 26, power conversion device 500 includes input terminals 1, a DC bus capacitor 2, a switching element unit 3, filter reactors 4u, 4v, 4w, filter capacitors 5u, 5v, 5w, output reactors 6u, 6v, 6w, and output terminals 7. Power conversion device 500 further includes voltage sensors 11, 13uv, 13vw, 13wu, current sensors 12u, 12v, 12w, 14u, 14v, 14w, and a controller 501.

Power conversion device 500 shown in FIG. 26 differs from power conversion device 21 in FIG. 3 in the configuration of switching element unit 3. Switching element unit 3 is configured with a three-phase inverter having six semiconductor switching elements 51 to 56. Switching element unit 3 has a first leg, a second leg, and a third leg connected in parallel. The first leg is configured such that semiconductor switching element 51 in the upper arm and semiconductor switching element 52 in the lower arm are connected in series. The second leg is configured such that semiconductor switching element 53 in the upper arm and semiconductor switching element 54 in the lower arm are connected in series. The third leg is configured such that semiconductor switching element 55 in the upper arm and semiconductor switching element 56 in the lower arm are connected in series. A diode is connected in anti-parallel with each of semiconductor switching elements 51 to 56.

The on/off of semiconductor switching elements 51 to 56 is controlled by control signals (PWM signal) S1 to S6 generated by controller 501. Switching element unit 3 thus deforms the voltage of the DC power supply (that is, DC bus voltage Vdc) supplied from input terminal 1 into three-phase pulse-like voltage.

Voltage sensor 11 detects the terminal-to-terminal voltage (DC bus voltage Vdc) of DC bus capacitor 2 and outputs a signal indicating the detected value to control unit 501.

Current sensor 12u is connected between the U-phase output terminal of switching element unit 3 and filter reactor 4u to detect current flowing through filter reactor 4u (hereinafter also referred to as "reactor current ILu") and output a signal indicating the detected value to control unit 501. Current sensor 12v is connected between the V-phase output terminal of switching element unit 3 and filter reactor 4v and detects current flowing through filter reactor 4v (hereinafter also referred to as "reactor current ILv") to output a signal indicating the detected value to control unit 501. Current sensor 12w is connected between the W-phase output terminal of switching element unit 3 and filter reactor 4w and detects current flowing through filter reactor 4w (hereinafter also referred to as "reactor current ILw") to output a signal indicating the detected value to controller 501.

Voltage sensor 13uv detects the terminal-to-terminal voltage of filter capacitor 5u (hereinafter also referred to as "output voltage Vcuv" of power conversion device 500) and outputs a signal indicating the detected value to controller 501. Voltage sensor 13vw detects the terminal-to-terminal voltage of filter capacitor 5v (hereinafter also referred to as "output voltage Vcvw" of power conversion device 500) and outputs a signal indicating the detected value to controller 501. Voltage sensor 13wu detects the terminal-to-terminal voltage of filter capacitor 5w (hereinafter also referred to as "output voltage Vcwu" of power conversion device 500) and outputs a signal indicating the detected value to controller 501.

Current sensor 14u is connected between filter capacitor 5u and output reactor 6u to detect current flowing through output reactor 6u (hereinafter also referred to as "output current Iou" of the power conversion device) and output a signal indicating the detected value to controller 501. Current sensor 14v is connected between filter capacitor 5v and output reactor 6v to detect current flowing through output reactor 6v (hereinafter also referred to as "output current Iov" of the power conversion device) and output a signal indicating the detected value to controller 501. Current sensor 14w is connected between filter capacitor 5w and output reactor 6w to detect current flowing through output reactor 6w (hereinafter also referred to as "output current Iow" of the power conversion device) and output a signal indicating the detected value to controller 501.

Controller 501 generates PWM signals S1 to S6 for controlling switching element unit 3, based on the detection signals from current sensors 12u, 12v, 12w (reactor currents ILu, ILv, ILw), the detection signals from current sensors 14u, 14v, 14w (output currents Iou, Iov, Iow), the detection signals from voltage sensor 11 (the detected value of DC bus voltage Vdc), and the detection signals from voltage sensors 13uv, 13vw, 13wu (the detected values of output voltages Vcuv, Vcvw, Vcwu).

(Configuration of Controller 501)

Figure 27:
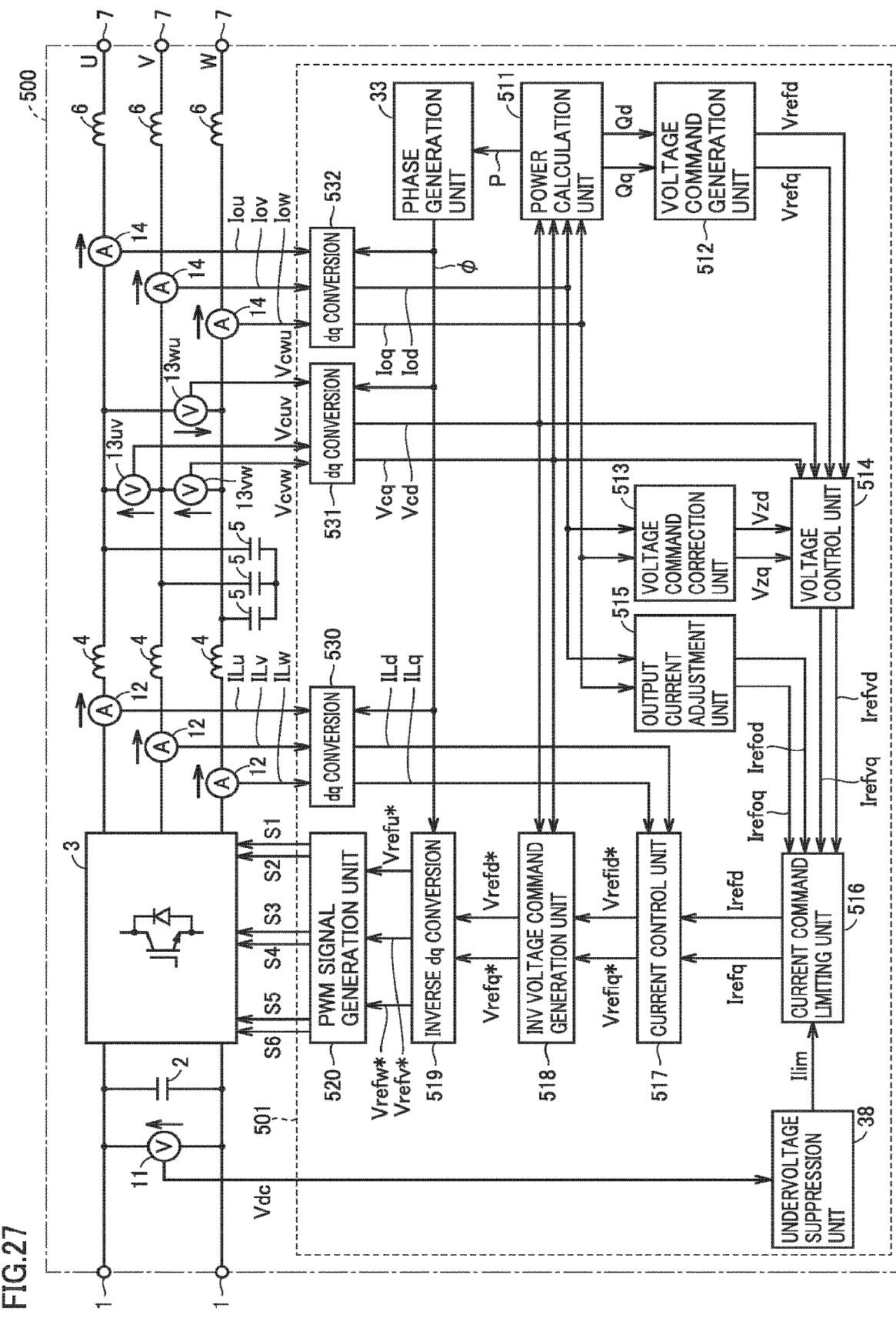
FIG. 27 is a functional block diagram illustrating an overall configuration of a control unit shown in FIG. 26.

FIG. 27 is a functional block diagram illustrating an overall configuration of controller 501 shown in FIG. 26. Referring to FIG. 27, controller 501 includes dq conversion units 530, 531, 532, a power calculation unit 511, a voltage command generation unit 512, a phase generation unit 33, a voltage command correction unit 513, a voltage control unit 514, an output current adjustment unit 515, an undervoltage suppression unit 38, a voltage command limiting unit 516, a current control unit 517, an INV voltage command generation unit 518, an inverse dq conversion unit 519, and a PWM signal generation unit 520.

Controller 501 shown in FIG. 27 may be configured with hardware or may be configured with software. Alternatively, controller 501 may be configured as a combination of hardware and software.

The configuration of controller 501 is described below, focusing on the differences from control unit 31 shown in FIG. 4.

In the present embodiment, controller 501 is configured to generate a voltage command by performing current feedback control on the rotation coordinates including the dq axis. In the following description, the rotation coordinates transformation (dq transformation) is transformation (absolute transformation) such that power matches before and after rotation coordinates transformation, where the voltage on the q axis when three-phase AC voltage is normal is 0 V. The rotation coordinates transformation is not limited to this.

(1) dq Conversion Units 530, 531, 532

The dq conversion unit 530 converts three-phase reactor currents ILu, ILv, ILw detected by current sensors 12u, 12v, 12w into d-axis reactor current ILd and q-axis reactor current ILq through rotation coordinates transformation based on internal phase φ generated by phase generation unit 33. Specifically, reactor currents ILd, ILq can be converted using Equation (8) below. Reactor currents ILd, ILq are applied to current control unit 517.

$$\begin{bmatrix} ILd \\ ILq \end{bmatrix} = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix} \begin{bmatrix} ILu \\ ILv \\ ILw \end{bmatrix} \quad (8)$$

The dq conversion unit 531 converts three-phase output voltages Vcuv, Vcvw, Vcwu detected by voltage sensors 13uv, 13vw, 13wu into d-axis output voltage Vcd and q-axis output voltage Vcq through rotation coordinates transformation based on internal phase φ generated by phase generation unit 33. Specifically, output voltages Vcd, Vcq can be converted using Equations (9) and (10) below. Output voltages Vcd, Vcq are applied to power calculation unit 511, INV voltage command generation unit 518, and voltage control unit 514.

$$\begin{bmatrix} Vcu \\ Vcv \\ Vcw \end{bmatrix} = \frac{1}{3}\begin{bmatrix} 1 & 0 & -1 \\ -1 & 0 & 1 \\ 0 & -1 & 1 \end{bmatrix}\begin{bmatrix} Vcuv \\ Vcvw \\ Vcwu \end{bmatrix} \quad (9)$$

$$\begin{bmatrix} Vcd \\ Vcq \end{bmatrix} = \sqrt{\frac{2}{3}}\begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix}\begin{bmatrix} Vcu \\ Vcv \\ Vcw \end{bmatrix} \quad (10)$$

The dq conversion unit 532 converts three-phase output currents Iou, Iov, Iow detected by current sensors 14*u*, 14*v*, 14*w* into d-axis output current Iod and q-axis output current Ioq through rotation coordinates transformation based on internal phase φ generated by phase generation unit 33. Specifically, output currents Iod, Ioq can be converted using Equation (11) below. Output currents Iod, Ioq are applied to power calculation unit 511, voltage command correction unit 513, and output current adjustment unit 515.

$$\begin{bmatrix} Iod \\ Ioq \end{bmatrix} = \sqrt{\frac{2}{3}}\begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix}\begin{bmatrix} Iou \\ Iov \\ Iow \end{bmatrix} \quad (11)$$

(2) Power Calculation Unit 511

Power calculation unit 511 calculates active power P and reactive powers Qd, Qq output by power conversion device 500 on the rotation coordinates. Reactive power Qd is reactive power by d-axis output voltage Vcd, and reactive power Qq is reactive power by q-axis output voltage Vcq. Active power P and reactive powers Qd, Qq can be calculated by Equation (12) below.

$$\begin{bmatrix} P \\ Qd \\ Qq \end{bmatrix} = \begin{bmatrix} Vcd \times Iod + Vcq \times Ioq \\ Vcd \times Ioq \\ -Vcq \times Iod \end{bmatrix} \quad (12)$$

(3) Power Command Generation Unit 512

Figure 28:
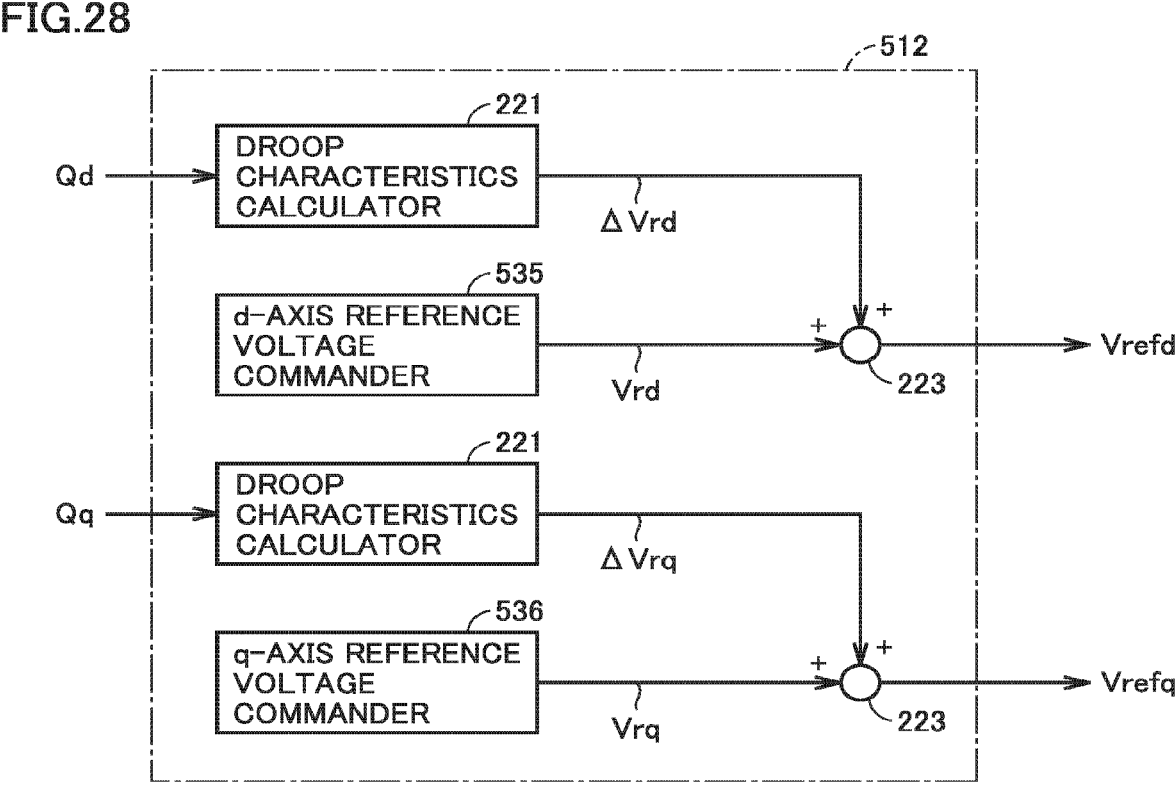
FIG. 28 is a block diagram showing an internal configuration of a voltage command generation unit shown in FIG. 27.

FIG. 28 is a block diagram showing an internal configuration of power command generation unit 512 shown in FIG. 27, in comparison with voltage command generation unit 34 (FIG. 14) according to the first embodiment.

Voltage command generation unit 512 is configured to receive reactive powers Qd, Qq calculated by power calculation unit 511 and output voltage command Vrefd, which is a target value of output voltage Vcd of power conversion device 500, and voltage command Vrefq, which is a target value of output voltage Vcq. Referring to FIG. 28, voltage command generation unit 512 includes a droop characteristics calculator 221, a d-axis reference voltage commander 535, a q-axis reference voltage commander 536, and an adder 223.

Droop characteristics calculator 221 calculates correction amounts ΔVrd, ΔVrq for reducing reactive powers Qd, Qq output by power conversion device 500, based on reactive powers Qd, Qq calculated by power calculation unit 511, in the same manner as droop characteristics calculator 221 in FIG. 14. Specifically, the value obtained by multiplying reactive power Qd by gain Kqd is correction amount ΔVrd (ΔVrd=Qd Kqd). The value obtained by multiplying reactive power Qq by gain Kqq is correction amount ΔVrq (ΔVrq=Qq×Kqq). Gains Kqd, Kqq may be the same value or may be different values. As shown in FIG. 15, the gain may be changed in accordance with the corresponding reactive power.

In this way, reactive power Qd produced by change in d-axis output voltage Vcd can be corrected by correcting the voltage command of d-axis output voltage Vcd with reactive power Qd by d-axis output voltage Vcd. Reactive power Qq produced by change in q-axis output voltage Vcq can be corrected by correcting the voltage command for q-axis output voltage Vcq with reactive power Qq by q-axis output voltage Vcq.

(4) Power Command Correction Unit 513

Figure 29:
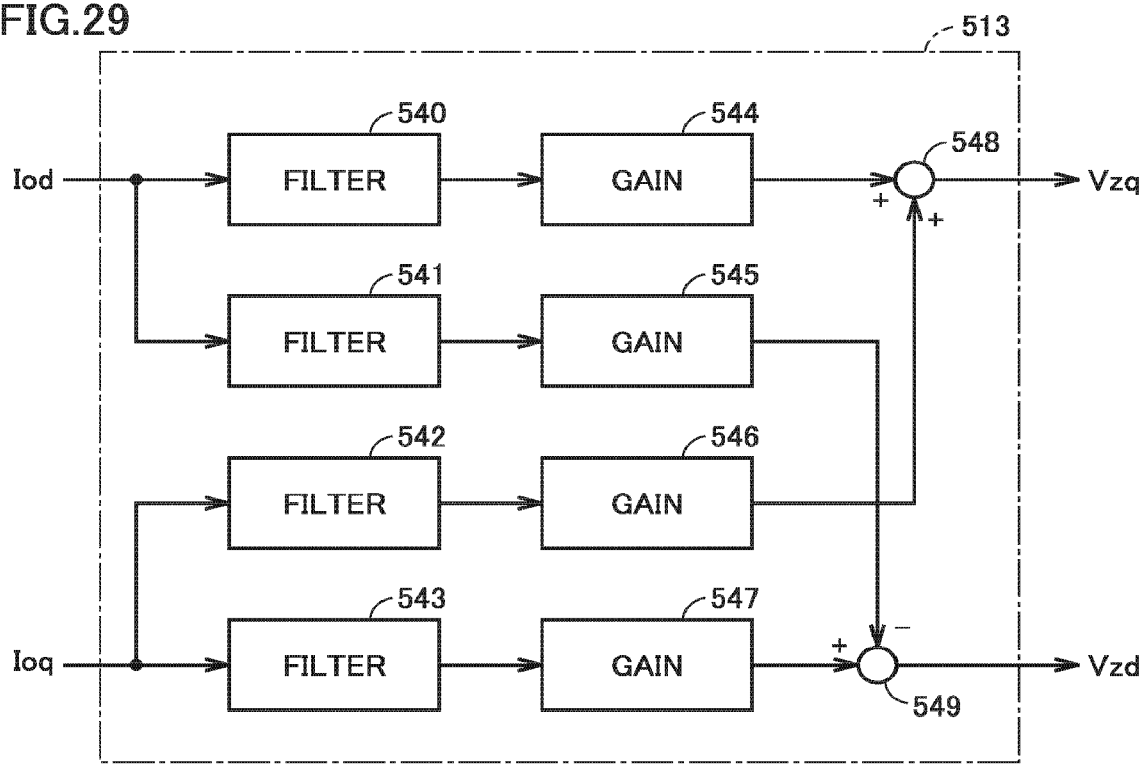
FIG. 29 is a block diagram showing an internal configuration of a voltage command correction unit shown in FIG. 27.

FIG. 29 is a block diagram showing an internal configuration of voltage command correction unit 513 shown in FIG. 27, in comparison with voltage command corrector 35 (FIG. 16) according to the first embodiment. Voltage command correction unit 513 is configured to receive the detected values of output currents Iod, Ioq generated by dq conversion unit 532 and output voltage command correction amounts Vzq, Vzd. Referring to FIG. 29, voltage command correction unit 513 includes filters 540 to 543, gains 544 to 547, an adder 548, and a subtractor 549.

Filters 540 to 543 are filters for removing (or attenuating) reference frequency components (fundamental components) of output currents Iod, Ioq. In the present embodiment, the filters are used on the rotation coordinates, and the reference frequency component (fundamental component) corresponds to a DC component (low-frequency component). Each of filters 540 to 543 therefore may be, for example, a configuration using a bypass filter or a configuration using a phase compensator.

Figure 30:
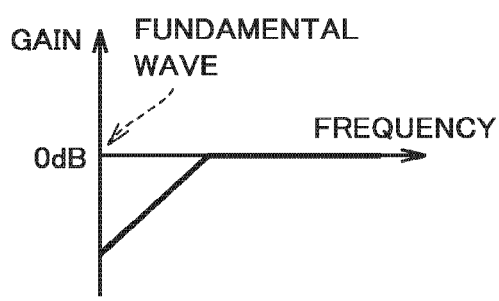
FIG. 30 is a diagram showing the frequency characteristics of a filter shown in FIG. 29.
Figure 30:
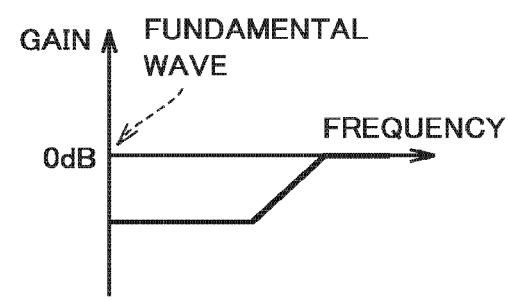

FIGS. 30(A) and 30(B) illustrate the frequency characteristics of a filter. In FIGS. 30(A) and 30(B), the horizontal axis shows frequency, and the vertical axis shows gain.

In FIG. 30(A), a filter constant is set such that the gain of the fundamental component is reduced. In FIG. 30(B), a filter constant is set such that the gain of DC component that is the fundamental component and the gain of the low-frequency component are reduced to the same degree.

Setting the frequency characteristics of the filter in this manner can achieve the effects equivalent to power conversion device 20 according to the first embodiment even in three-phase power conversion device 500 using rotation coordinates transformation (dq transformation).

In addition, the interference between the d-axis and the q-axis can be prevented by calculating voltage command correction amount Vzq on the q-axis using d-axis output current Iod and calculating voltage command correction amount Vzd on the d-axis using q-axis output current Ioq.

(5) Voltage Control Unit 514

Figure 31:
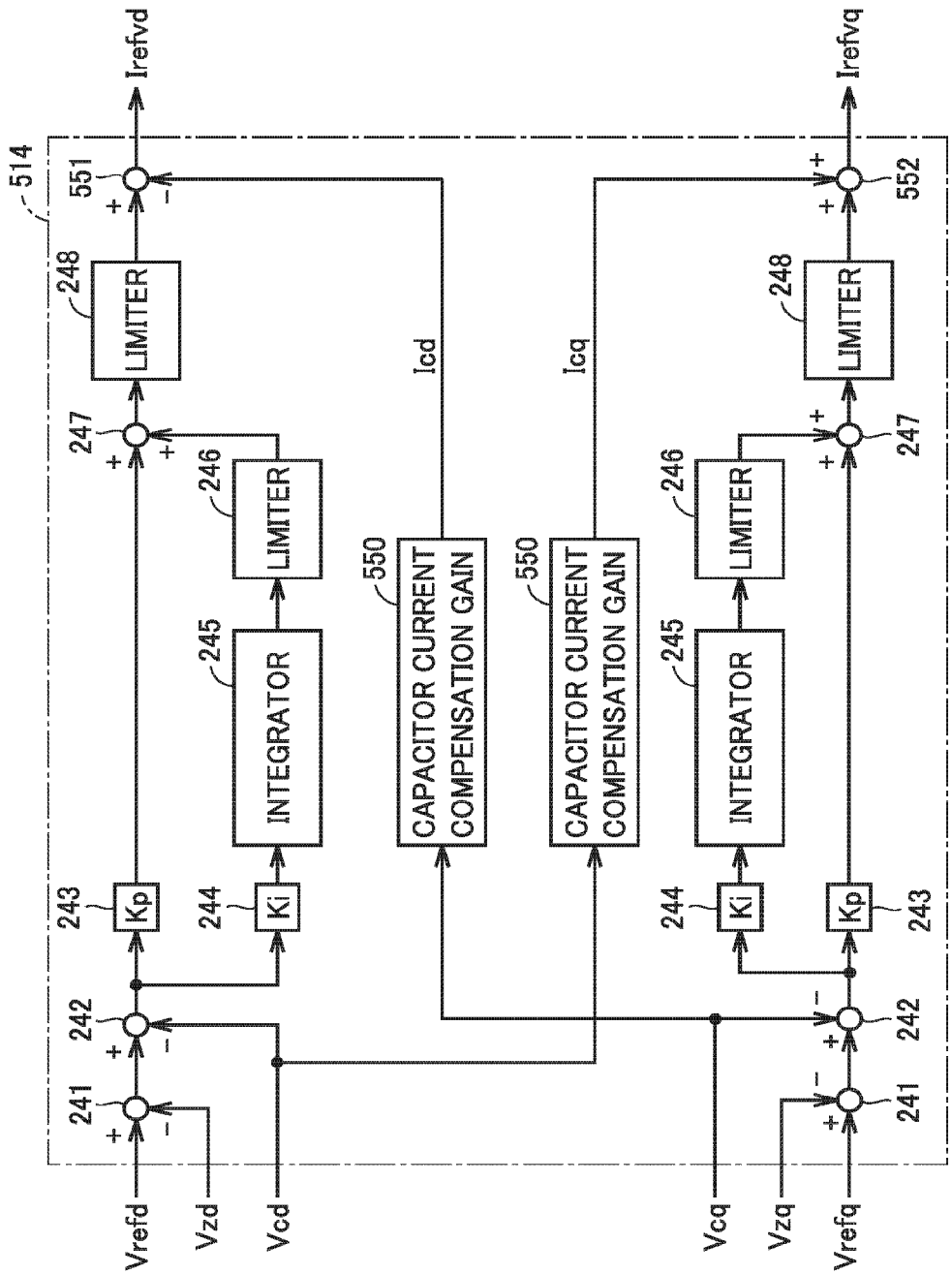
FIG. 31 is a block diagram showing an internal configuration of a voltage control unit shown in FIG. 27.

FIG. 31 is a block diagram showing an internal configuration of voltage control unit 514 shown in FIG. 27, in comparison with voltage control unit 36 (FIG. 18) according to the first embodiment. Voltage control unit 514 is configured to receive voltage commands Vrefd, Vrefq generated by voltage command generation unit 512, voltage command correction amounts Vzd, Vzq generated by voltage command correction unit 513, and output voltages Vcd, Vcq generated by dq conversion unit 531 and output d-axis current command Irefvd and q-axis current command Irefvq.

Voltage control unit 514 is to correct output voltages Vcd, Vcq of power conversion device 500, in the same manner as voltage control unit 36 (FIG. 18). That is, voltage control unit 514 corrects output voltages Vcd, Vcq so as to suppress the deviations of output voltages Vcd, Vcq caused by voltage drop in filter reactors 4u, 4v, 4w and the harmonics of output currents Iod, Ioq.

Referring to FIG. 31, voltage control unit 514 differs from voltage control unit 36 shown in FIG. 18 in that it includes a capacitor current compensation gain 550.

Capacitor current compensation gain 550 calculates current of filter capacitors 5u, 5v, 5w (FIG. 26) and compensates the calculated currents as current commands. Currents Icd, Icq of filter capacitor 5 are given by Equation (13) below, where C is the capacitance of filter capacitor 5, and f is a reference frequency.

$$\begin{bmatrix} Icd \\ Icq \end{bmatrix} = \begin{bmatrix} 2\pi \times f \times C \times Vcq \\ 2\pi \times f \times C \times Vcd \end{bmatrix} \quad (13)$$

(6) Output Current Adjustment Unit 515

Figure 32:
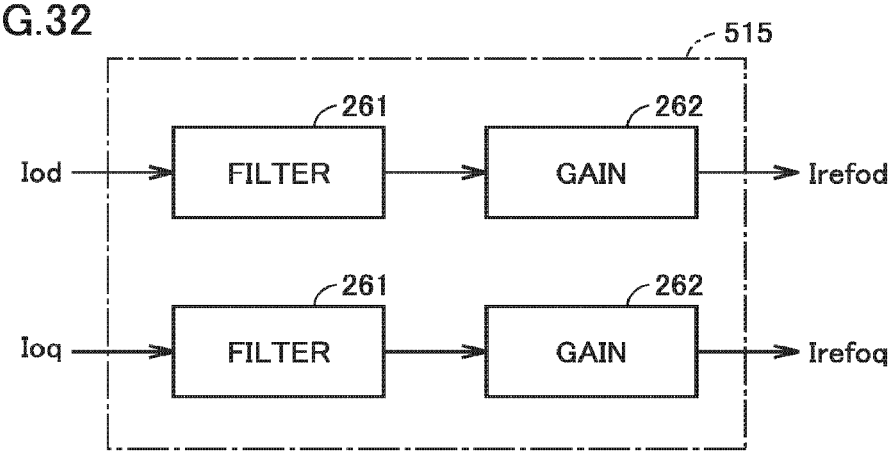
FIG. 32 is a block diagram showing an internal configuration of an output current adjustment unit shown in FIG. 27.

FIG. 32 is a block diagram showing an internal configuration of output current adjustment unit 515 shown in FIG. 27, in comparison with output current adjustment unit 37 (FIG. 18) according to the first embodiment. Output current adjustment unit 515 is configured to receive output currents Iod, Ioq generated by dq conversion unit 532 and output current commands Irefod, Irefoq. Output current adjustment unit 515 differs from output current adjustment unit 37 shown in FIG. 18 in that d-axis current command Irefod and q-axis current command Irefoq are calculated individually.

(7) Current Command Limiting Unit 516

Figure 33:
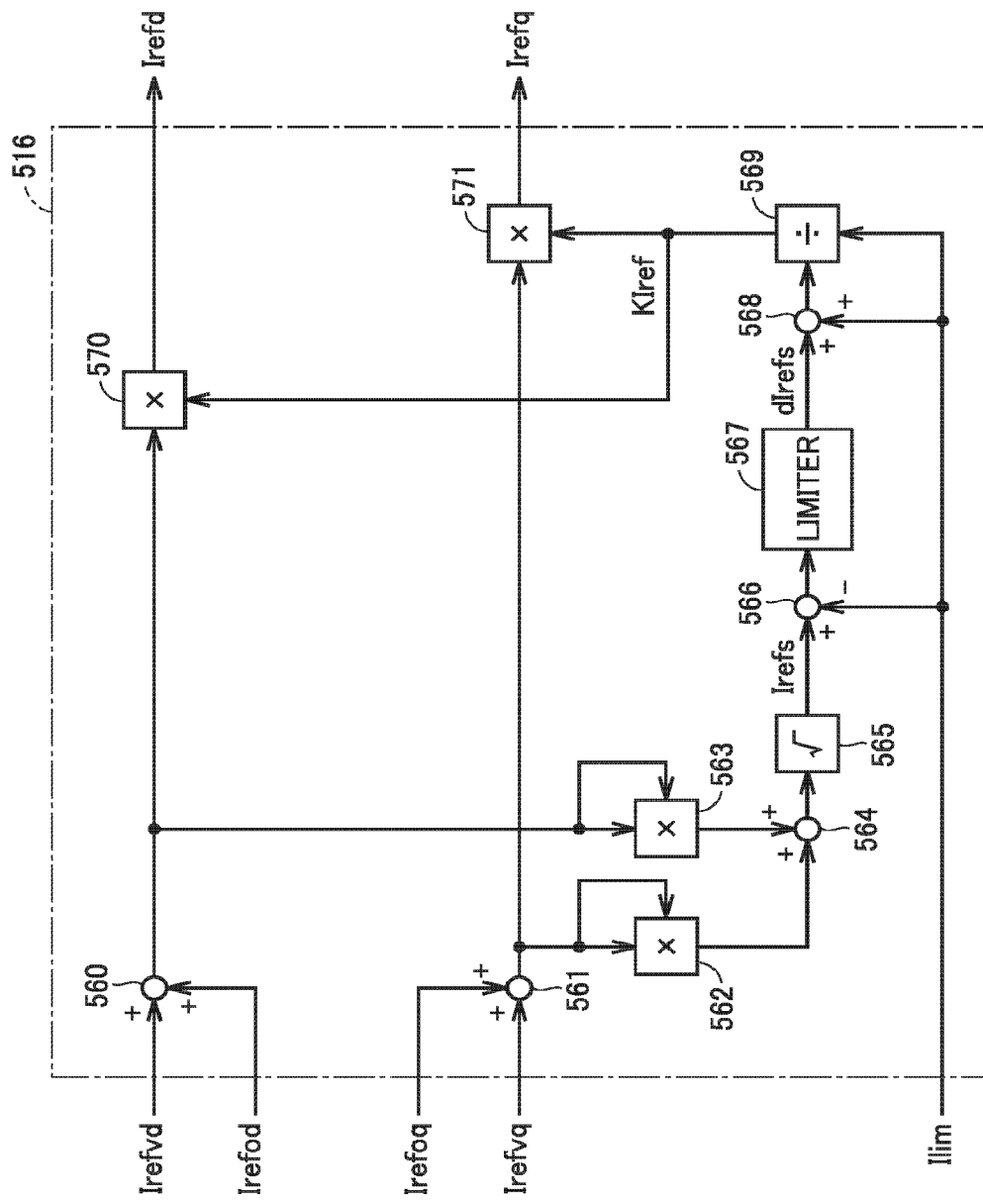
FIG. 33 is a block diagram showing an internal configuration of a current command limiting unit shown in FIG. 27.

FIG. 33 is a block diagram showing an internal configuration of current command limiting unit 516 shown in FIG. 27, in comparison with current command limiting unit 39 (FIG. 18) according to the first embodiment. Current command limiting unit 516 receives current commands Irefvd, Irefvq generated by voltage control unit 514, current commands Irefod, Irefoq generated by output current adjustment unit 515, and current limit command Ilim generated by undervoltage suppression unit 38 and output d-axis current command Irefd and q-axis current command Trefq. Current command limiting unit 516 combines the current commands generated by voltage control unit 514 and output current adjustment unit 515 to generate apparent current command Irefs. Current command limiting unit 516 limits the generated apparent current command Irefs to current limit command Ilim or smaller.

Referring to FIG. 33, current command limiting unit 516 includes adders 560, 561, 564, 568, a subtractor 566, multipliers 562, 563, 570, 571, a square root 565, a limiter 567, and a divider 569.

Adder 560 adds d-axis current command Irefvd to d-axis current command Irefod. Multiplier 563 outputs the square value of the addition result of adder 560. Adder 561 adds q-axis current command Irefvq to q-axis current command Irefoq. Multiplier 562 outputs the square value of the addition result of adder 561. Adder 564 adds the output of multiplier 562 to the output of multiplier 563. Square root 565 outputs the square root of output of adder 564. Apparent current command Irefs is generated by calculating the square roots of the d-axis component and the q-axis component of the sum of current commands Irefv and Irefo using adders 560, 561, 564, multipliers 562, 563, and square root 565.

Subtractor 566 subtracts current limit command Ilim from apparent current command Irefs and outputs the subtraction result. Limiter 567 calculates over-apparent current dIrefs of apparent current command Irefs for current limit command Ilim by limiting the output of subtractor 566 to zero or greater. Adder 568 adds over-apparent current dIrefs to current limit command Ilim and outputs the addition result. Multiplier 569 divides current limit command Ilim by the output of adder 568 (Ilim+dIrefs) to calculate adjustment gain KIref of the current command. Adjustment gain KIref is given by Equation (14) below.

$$KIref = \frac{I\lim}{dIrefs + I\lim} \quad (14)$$

When over-apparent current dIrefs is zero, there is no need for adjusting the current command (that is, Kiref=1), and thus the output of adder 560 (=Irefvd+Irefod) is multiplied by Kiref=1 in multiplier 570. In multiplier 571, the output of adder 561 (=Irefvq+Irefoq) is multiplied by Kiref=1.

On the other hand, when over-apparent current dIrefs is greater than zero, KIrek<1. Accordingly, the output of adder 560 (=Irefvd+Irefod) is multiplied by Kiref<1, and the output of adder 561 (=Irefvq+Irefoq) is multiplied by Kiref<1. In this way, the magnitude of the current command on each axis is adjusted while the ratio of current command between the d-axis and the q-axis is kept, whereby apparent current command Irefs is limited to current limit command Ilim or smaller.

In the configuration example in FIG. 33, the method of adjusting the current command while keeping the ratio between the d-axis and the q-axis constant. However, since the voltage drop in DC bus capacitor 2 changes with active power, only the d-axis current command may be limited when rotation coordinates transformation is performed with the d-axis current command as active current. Alternatively, although in the configuration in FIG. 33, the current command is adjusted by multiplying the current command on each axis by adjustment gain Kiref, the current command may be adjusted by addition and subtraction.

(8) Current Control Unit 517

Figure 34:
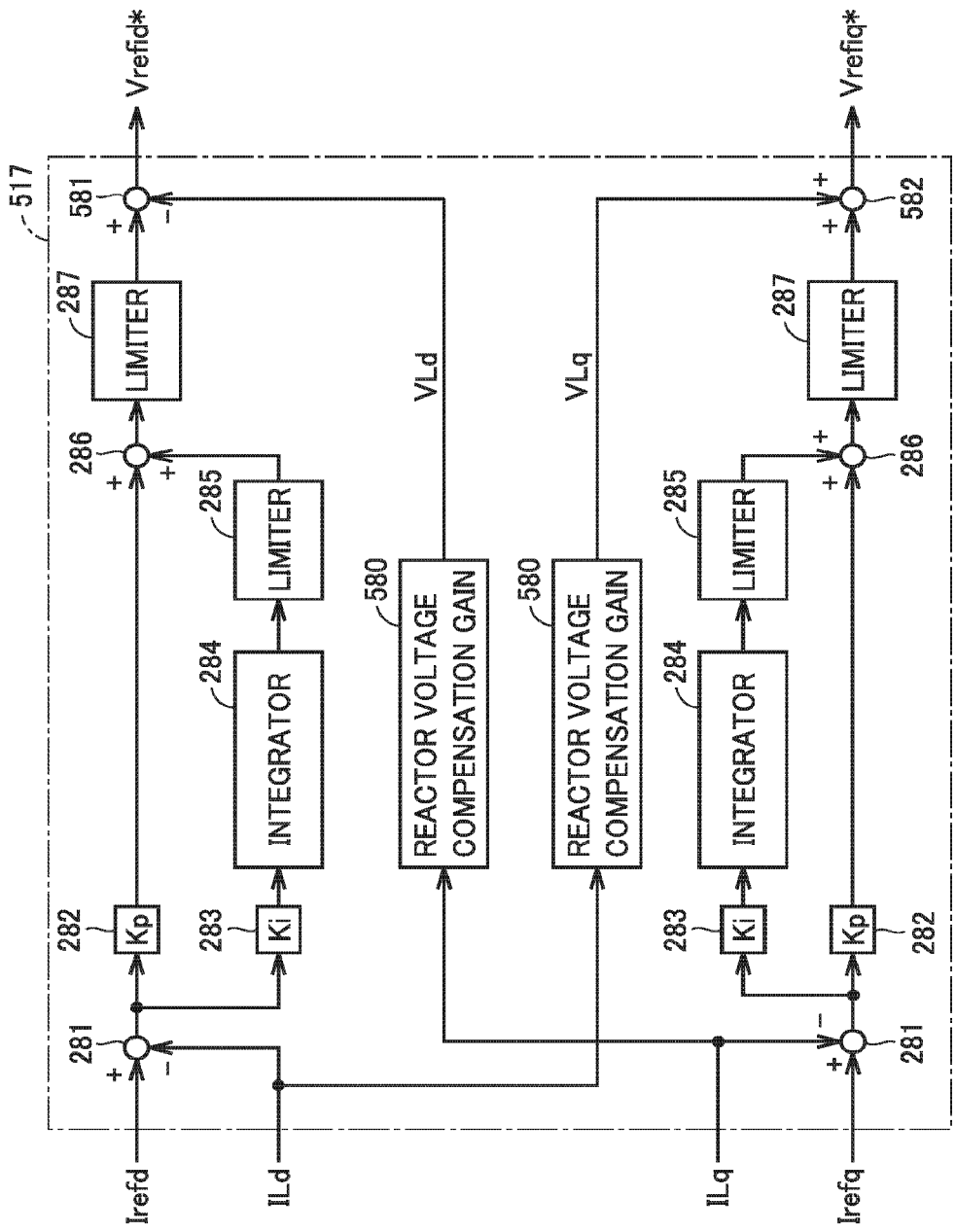
FIG. 34 is a block diagram showing an internal configuration of a current control unit shown in FIG. 27.

FIG. 34 is a block diagram showing an internal configuration of current control unit 517 shown in FIG. 27, in comparison with current control unit 40 (FIG. 19) according to the first embodiment. Current control unit 517 receives current commands Irefd, Irefq generated by current command limiting unit 516 and reactor currents ILd, ILq generated by dq conversion unit 530 and outputs d-axis voltage command Vrefid* and q-axis voltage command Vrefiq*.

Voltage control unit 517 is to correct reactor currents ILu, ILv, ILw of power conversion device 500, specifically, configured to correct deviations of reactor currents ILu, ILv, ILw due to change in DC bus voltage Vdc and output voltages Vcu, Vcv, Vcw.

Referring to FIG. 34, current control unit 517 includes subtractors 281, 581, a proportional gain (Kp) 282, an integral gain (Ki) 283, an integrator 284, limiters 285, 287, adders 286, 582, and a reactor voltage compensation gain 580.

Current control unit 517 differs from current control unit 40 shown in FIG. 19 in that it includes reactor voltage compensation gain 580. Reactor voltage compensation gain 580 calculates voltages produced in filter reactors 4u, 4v, 4w based on reactor currents ILd, ILq generated by dq conversion unit 530 and compensates the calculation result as a voltage command. The voltage of filter reactor 4 is given by Equation (15) below, where L is the inductance of filter reactor 4 and f is a reference frequency.

$$\begin{bmatrix} VLd \\ VLq \end{bmatrix} = \begin{bmatrix} 2\pi \times f \times L \times ILq \\ 2\pi \times f \times L \times ILd \end{bmatrix} \quad (15)$$

(9) INV Voltage Command Generation Unit 518

Figure 35:
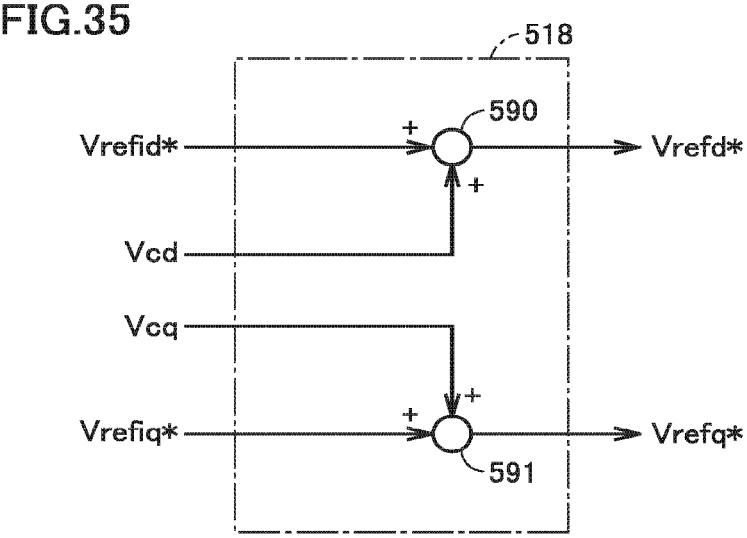
FIG. 35 is a block diagram showing an internal configuration of an INV voltage command generation unit shown in FIG. 27.

FIG. 35 is a block diagram showing an internal configuration of INV voltage command generation unit 518 shown in FIG. 27, in comparison with INV voltage command generation unit (FIG. 19) according to the first embodiment. INV voltage command generation unit 518 receives voltage commands Vrefid*, Vrefiq* generated by current control unit 517 and output voltages Vcd, Vcq generated by dq conversion unit 531 and outputs d-axis voltage command Vrefd* and q-axis voltage command Vrefq*.

Referring to FIG. 35, INV voltage command generation unit 518 includes adders 590, 591. Adder 590 adds voltage command Vrefid* to output voltage Vcd and outputs the addition result (Vrefid*+Vcd) as d-axis voltage command Vrefd* (Vrefd*=Vrefid*+Vcd). Adder 591 adds voltage command Vrefiq* to output voltage Vcq and outputs the addition result (Vrefiq*+Vcq) as q-axis voltage command Vrefq* (Vrefq*=Vrefiq*+Vcq).

(10) Inverse dq Conversion Unit 519

Returning to FIG. 27, inverse dq conversion unit 519 converts voltage commands Vrefd*, Vrefq* on the rotation coordinates generated by INV voltage command generation unit 518 into three-phase voltage commands (U-phase voltage command Vrefu*, V-phase voltage command Vrefv*, W-phase voltage command Vrefw* through inverse conversion based on internal phase φ generated by phase generation unit 33. Specifically, three-phase voltage commands Vrefu*, Vrefv*, Vrefw* can be converted using Equation (16) below. Three-phase voltage commands Vrefu*, Vrefv*, Vrefw* are applied to PWM signal generation unit 520.

$$\begin{bmatrix} Vrefu* \\ Vrefv* \\ Vrefw* \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} Vrefd* \\ Vrefq* \end{bmatrix} \quad (16)$$

(11) PWM Signal Generation Unit 520

Figure 36:
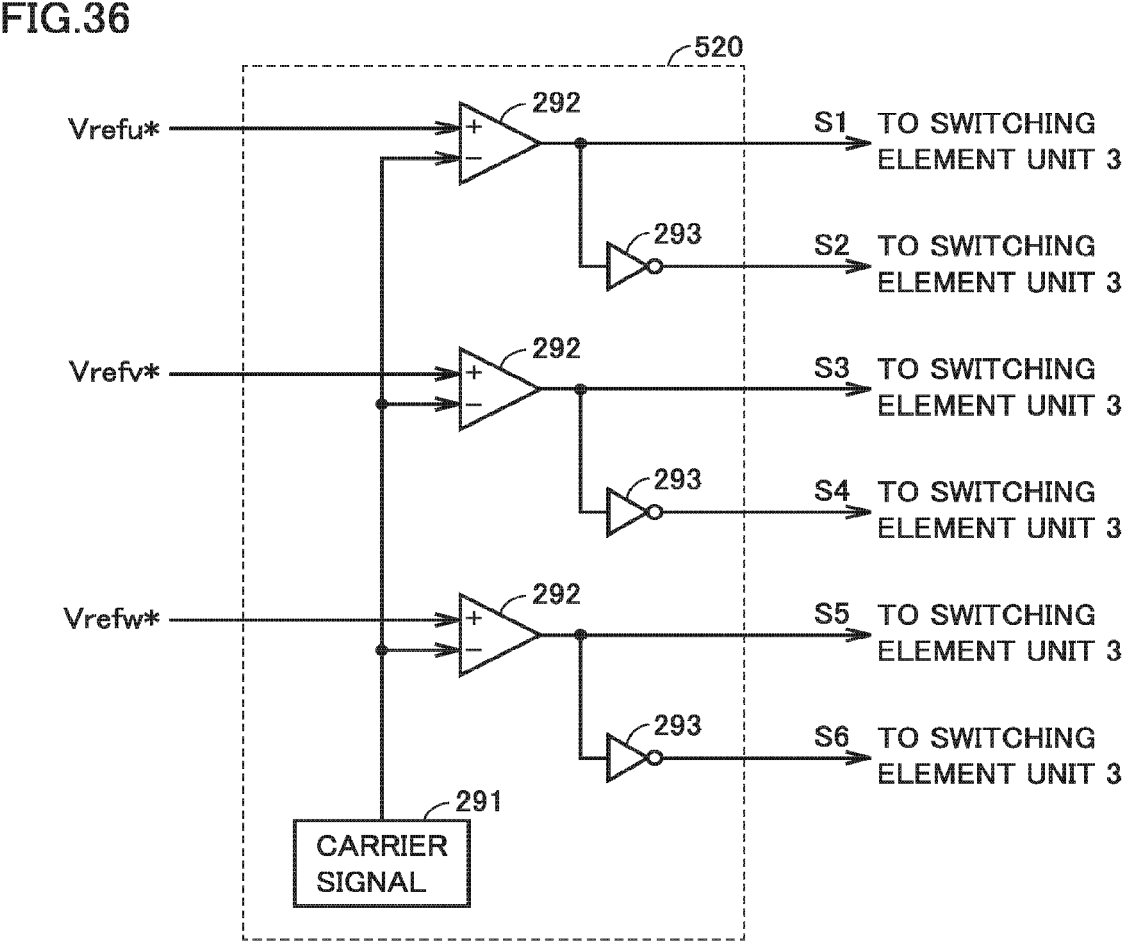
FIG. 36 is a block diagram showing an internal configuration of a PWM signal generation unit shown in FIG. 27.

FIG. 36 is a block diagram showing an internal configuration of PWM signal generation unit 520 shown in FIG. 27, in comparison with PWM signal generation unit 42 (FIG. 19) according to the first embodiment.

Referring to FIG. 36, PWM signal generation unit 520 is configured to generate PWM signals S1 to S6, based on three-phase voltage commands Vrefu*, Vrefv*, Vrefw* generated by INV voltage command generation unit 518 and carrier signal Scarr.

Specifically, PWM signal generation unit 520 includes carrier signal generator 291 generating carrier signal Scarr, three comparators 292, and three inverters 293. For the sake of simplicity, in the following description, a short-circuit preventing time (dead time) for a switching leg is not taken into consideration. The process of generating each PWM signal is similar to the one described with reference to FIG. 20 and will not be further elaborated.

As described above, power conversion system 1000 according to the present second embodiment can achieve the similar operation effects as power conversion system 1000 according to the first embodiment.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 input terminal, 2 DC bus capacitor, 3 switching element unit, 4 filter reactor, 5 filter capacitor, 6 output reactor, 7 output terminal, 11, 13 voltage sensor, 12, 14 current sensor, 21, 21a, 21b, 21c, 210, 210a, 210b, 210c, 500 power conversion device, 31, 501 controller, 32, 511 power calculation unit, 33 phase generation unit, 34, 512 voltage command generation unit, 35, 513 voltage command correction unit, 36, 514 voltage control unit, 37, 515 output current adjustment unit, 38 undervoltage suppression unit, 39, 516 current command limiting unit, 40, 517 current control unit, 41, 518 INV voltage command generation unit, 42, 520 PWM signal generation unit, 51 to 54 semiconductor switching element, 60 DC power supply, 61 load, 101, 225 sine wave generator, 102 cosine wave generator, 103 active power calculator, 104 reactive power calculator, 111, 131 zero-cross signal outputter, 112, 132, 214 signal delay, 113, 140, 141, 151, 161, 171, 181, 226, 562, 563, 570, 571 multiplier, 114, 117, 134, 152, 162, 172, 182, 245, 255, 284 integrator, 115, 118, 153, 163, 173, 183 sample and hold, 116, 133 fixed signal outputter, 119, 154, 164, 174, 184, 569 divider, 136 sine wave voltage measurer, 137 cosine wave voltage measurer, 138 sine wave current measurer, 139 cosine wave current measurer, 142, 204, 211, 241, 242, 252, 260, 281, 549, 551, 566, 581 subtractor, 155, 165, 175, 185, 224, 232, 262, 544, 545, 546, 547 gain, 201, 221 droop characteristics calculator, 202 change limiter, 203 reference frequency command unit, 205 phase generator, 212, 246, 248, 256, 258, 273, 285, 287, 567 limiter, 213, 223, 247, 257, 271, 286, 290, 548, 552, 560, 561, 564, 568, 582, 590, 591 adder, 222 reference voltage effective value, 231, 261, 540, 541, 542, 543 filter, 243, 253, 282 proportional gain, 244, 254, 283 integral gain, 251 lower limit voltage, 259 initial limit current, 291 carrier signal generator, 292 comparator, 293 inverter, 301 switch, 1000, 2000 power conversion system, T1 input terminal, T2 output terminal, 530, 531, 532 dq conversion unit, 519 inverse dq conversion unit, 535 d-axis reference voltage commander, 536 q-axis reference voltage commander, 550 capacitor current correction gain, 565 square root, 580 reactor current compensation gain.

The invention claimed is:

1. A power conversion device comprising:
an input terminal connected to a DC power supply;
an output terminal connected to a load;
a switching element unit that converts DC power supplied from the DC power supply to the input terminal into AC power and outputs the AC power to the output terminal;
a filter reactor and a filter capacitor that smooth output of the switching element unit;
an output reactor disposed between the filter reactor and the load;
a first current sensor that detects reactor current flowing through the filter reactor;
a first voltage sensor that detects output voltage output between terminals of the filter capacitor;

a second current sensor that detects output current flowing through the output reactor; and
a controller that controls the switching element unit, based on detected values of the first and second current sensors and the first voltage sensor, wherein
the controller
generates a voltage command based on the output current and the output voltage,
generates a correction amount of the voltage command based on the output current in which a reference frequency component is attenuated,
generates a current command based on an addition value of the voltage command and the correction amount, and
controls the switching element unit such that the reactor current matches the current command.

2. The power conversion device according to claim 1, wherein the controller includes a filter for attenuating the reference frequency component of the output current and generates the correction amount based on output of the filter.

3. The power conversion device according to claim 2, wherein the filter has a frequency characteristic in which gain at the reference frequency is lowest and at least one of gain at a frequency higher than the reference frequency and gain at a frequency lower than the reference frequency is higher than gain at the reference frequency.

4. The power conversion device according to claim 1, wherein
the controller
calculates active power output from the output terminal, based on the output current, the output voltage, and an internal phase,
generates the internal phase based on an internal frequency corrected in accordance with the active power, and
generates the voltage command based on the internal phase.

5. The power conversion device according to claim 1, wherein
the controller
calculates reactive power output from the output terminal, based on the output current, the output voltage, and an internal phase, and
generates the voltage command based on an amplitude corrected in accordance with the reactive power.

6. The power conversion device according to claim 1, wherein
the controller
calculates active power and reactive power output from the output terminal, based on the output current, the output voltage, and an internal phase,
generates the internal phase based on an internal frequency corrected in accordance with the active power, and
generates the voltage command based on an amplitude corrected in accordance with the reactive power and the internal phase.

7. The power conversion device according to claim 1, further comprising:
a DC bus capacitor that smooths DC voltage supplied to the input terminal and supplies the smoothed DC voltage to the switching element unit; and
a second voltage sensor that detects a terminal-to-terminal voltage of the DC bus capacitor, wherein
the controller limits the current command to an initial limit current value when a detected value of the terminal-to-terminal voltage of the DC bus capacitor is higher than a lower limit voltage, and
the controller limits the current command to a current value lower than the initial limit current value when a detected value of the terminal-to-terminal voltage of the DC bus capacitor is lower than the lower limit voltage.

8. A power conversion system comprising a plurality of power conversion devices connected in parallel with a load, each of the power conversion devices including:
an input terminal connected to a DC power supply;
an output terminal connected to the load;
a switching element unit that converts DC power supplied from the DC power supply to the input terminal into AC power and outputs the AC power to the output terminal;
a filter reactor and a filter capacitor that smooth output of the switching element unit;
an output reactor disposed between the filter reactor and the load;
a first current sensor that detects reactor current flowing through the filter reactor;
a first voltage sensor that detects output voltage output between terminals of the filter capacitor;
a second current sensor that detects output current flowing through the output reactor; and
a controller that controls the switching element unit, based on detected values of the first and second current sensors and the first voltage sensor, wherein
the controller
generates a voltage command based on the output current and the output voltage,
generates a correction amount of the voltage command based on the output current in which a reference frequency component is attenuated,
generates a current command based on an addition value of the voltage command and the correction amount, and
controls the switching element unit such that the reactor current matches the current command.

9. The power conversion system according to claim 8, wherein
the controller includes a filter for attenuating the reference frequency component of the output current and generates the correction amount based on output of the filter, and
a frequency characteristic of the filter differs among the power conversion devices.

10. The power conversion system according to claim 8, wherein
the controller includes a filter for attenuating the reference frequency component of the output current and generates the correction amount by multiplying output of the filter by gain, and
the gain differs among the power conversion devices.

11. The power conversion system according to claim 8, wherein
the controller
calculates active power output from the output terminal, based on the output current, the output voltage, and an internal phase,
generates the internal phase based on an internal frequency corrected using a multiplication value of the active power and a droop characteristic gain, and
generates the voltage command based on the internal phase, and
the droop characteristic gain is set in accordance with a remaining capacity of the DC power supply.

12. The power conversion system according to claim 11, wherein the droop characteristic gain differs among the power conversion devices.

* * * * *